US012155345B2

(12) United States Patent
Dechant

(10) Patent No.: US 12,155,345 B2
(45) Date of Patent: Nov. 26, 2024

(54) PIVOTING UNIT FOR A TRACKING APPARATUS FOR SOLAR MODULES

(71) Applicant: SCHLETTER INTERNATIONAL B.V., Amsterdam (NL)

(72) Inventor: Gabriel Dechant, Gstadt am Chiemsee (DE)

(73) Assignee: SCHLETTER INTERNATIONAL B.V., Amsterdam (NL)

( * ) Notice: Subject to any disclaimer, the term of this patent is extended or adjusted under 35 U.S.C. 154(b) by 958 days.

(21) Appl. No.: 17/040,844

(22) PCT Filed: Mar. 23, 2018

(86) PCT No.: PCT/EP2018/057495
§ 371 (c)(1),
(2) Date: Sep. 23, 2020

(87) PCT Pub. No.: WO2019/179632
PCT Pub. Date: Sep. 26, 2019

(65) Prior Publication Data
US 2021/0021229 A1  Jan. 21, 2021

(51) Int. Cl.
*H02S 20/32* (2014.01)
*F24S 30/425* (2018.01)
(Continued)

(52) U.S. Cl.
CPC ............ *H02S 20/32* (2014.12); *F24S 30/425* (2018.05); *F24S 2025/018* (2018.05);
(Continued)

(58) Field of Classification Search
CPC ... H02S 20/32; F24S 30/425; F24S 2025/018; F24S 2025/019; F24S 2030/11;
(Continued)

(56) References Cited

U.S. PATENT DOCUMENTS 3,597,559 A * 8/1971 van Riemskijk ........ H01H 3/44
74/436
3,818,747 A * 6/1974 Van Riemsdijk ....... F16H 27/06
74/436
(Continued)

FOREIGN PATENT DOCUMENTS

CN 104539230 A1 4/2015
DE 2908122 A1 9/1979
(Continued)

OTHER PUBLICATIONS

First Examination Report issued by the European Patent Office for European Patent Application No. 18 712 905.1, dated Nov. 17, 2021.
(Continued)

*Primary Examiner* — Muhammad Ijaz
(74) *Attorney, Agent, or Firm* — Bradley Arant Boult Cummings LLP; Henry B. Ward, III

(57) ABSTRACT

A pivoting unit for a tracking apparatus for solar modules, comprising at least one cross member pivotable about a pivot axis, at least one drive arch, which is connected to the at least one cross member and has a plurality of drive recesses and a plurality of retaining recesses, and at least one rotatably mounted drive unit, the rotatably mounted drive unit being designed such that it engages in at least one of the drive recesses of the drive arch in order to pivot the at least one cross member. The drive unit is designed in such a way that it engages in at least one of the retaining recesses in order to hold the cross member in a pivoted position.

32 Claims, 34 Drawing Sheets

(51) Int. Cl.
*F24S 25/00* (2018.01)
*F24S 30/00* (2018.01)

(52) U.S. Cl.
CPC ...... *F24S 2025/019* (2018.05); *F24S 2030/11* (2018.05); *F24S 2030/134* (2018.05); *F24S 2030/136* (2018.05)

(58) Field of Classification Search
CPC ........... F24S 2030/134; F24S 2030/136; F24S 2030/14; Y02E 10/47; Y02E 10/50
See application file for complete search history.

(56) References Cited

U.S. PATENT DOCUMENTS

| 4,606,235 | A | 8/1986 | Kindt | |
| 10,415,853 | B2* | 9/2019 | Habdank | F24S 30/425 |
| 2008/0066985 | A1* | 3/2008 | Cheng | F16H 27/06 180/220 |
| 2014/0338659 | A1* | 11/2014 | Corio | F24S 30/428 126/714 |
| 2016/0365830 | A1 | 12/2016 | Bailey et al. | |
| 2017/0331414 | A1* | 11/2017 | Bailey | H02S 20/30 |
| 2018/0091087 | A1* | 3/2018 | Bailey | H02S 20/10 |
| 2018/0091088 | A1* | 3/2018 | Barton | F24S 30/425 |
| 2019/0190440 | A1* | 6/2019 | Kingsley | H02S 20/32 |
| 2019/0363669 | A1* | 11/2019 | Wildman | F24S 25/10 |
| 2021/0021229 | A1* | 1/2021 | Dechant | H02S 20/32 |
| 2021/0058025 | A1* | 2/2021 | Dechant | F24S 30/425 |
| 2021/0211089 | A1* | 7/2021 | Kufner | F16H 27/06 |
| 2022/0278642 | A1* | 9/2022 | Kumar | H02S 20/32 |

FOREIGN PATENT DOCUMENTS

| FR | 2992405 A1 | 12/2013 | |
| WO | WO-2004044501 A1 * | 5/2004 | ........... F24S 30/422 |
| WO | 2009146468 A1 | 12/2009 | |
| WO | 2016192766 A1 | 12/2016 | |
| WO | 2018009634 A1 | 1/2018 | |
| WO | 2019179781 A1 | 9/2019 | |

OTHER PUBLICATIONS

International Search Report issued by the European Patent Office, dated Oct. 11, 2018.
International Preliminary Report on Patentabiity issued by the European Patent Office, dated Feb. 17, 2020.
Office Action issued by the European Patent Office for European Patent Application No. 18 712 905.1, dated Jul. 7, 2023.

* cited by examiner

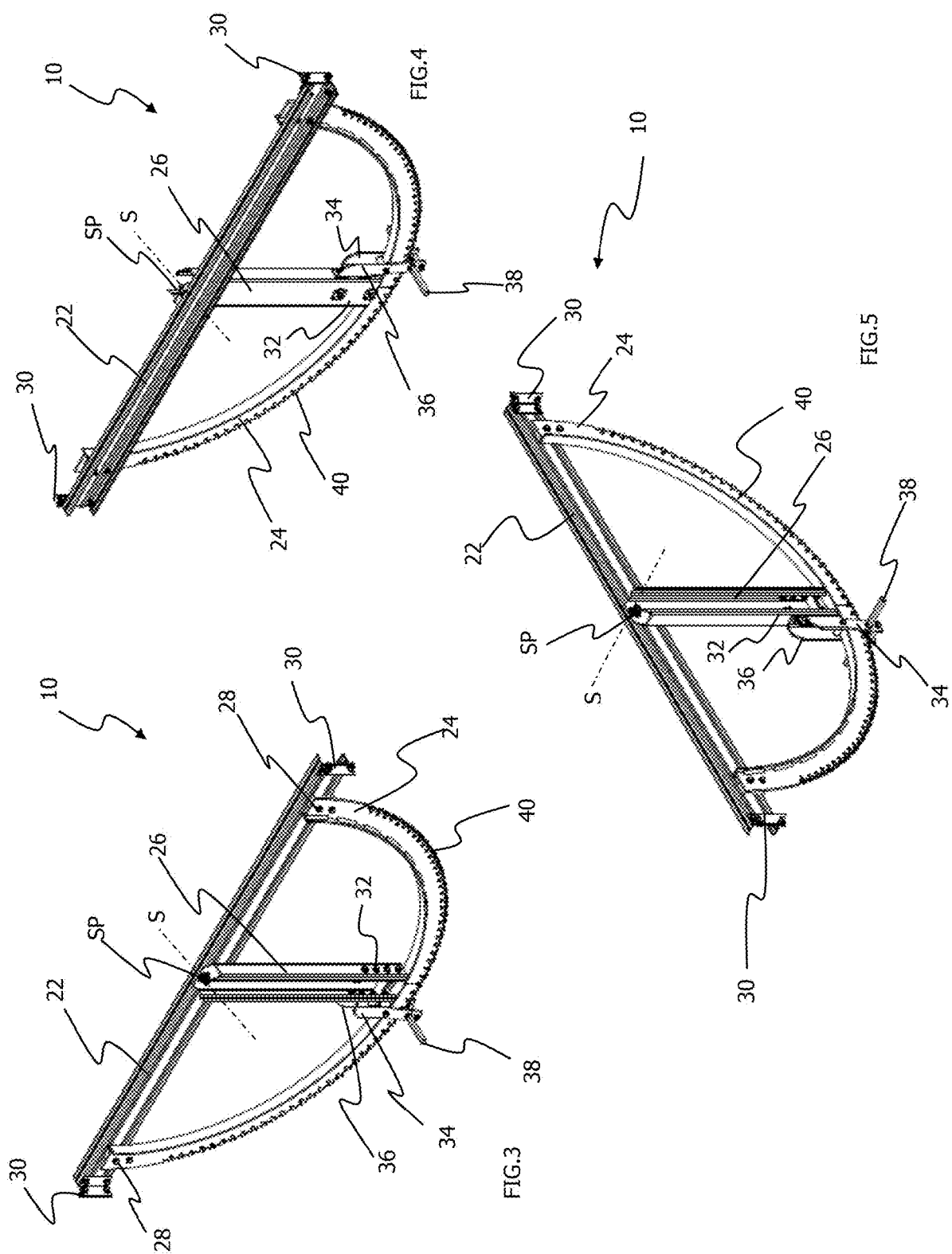

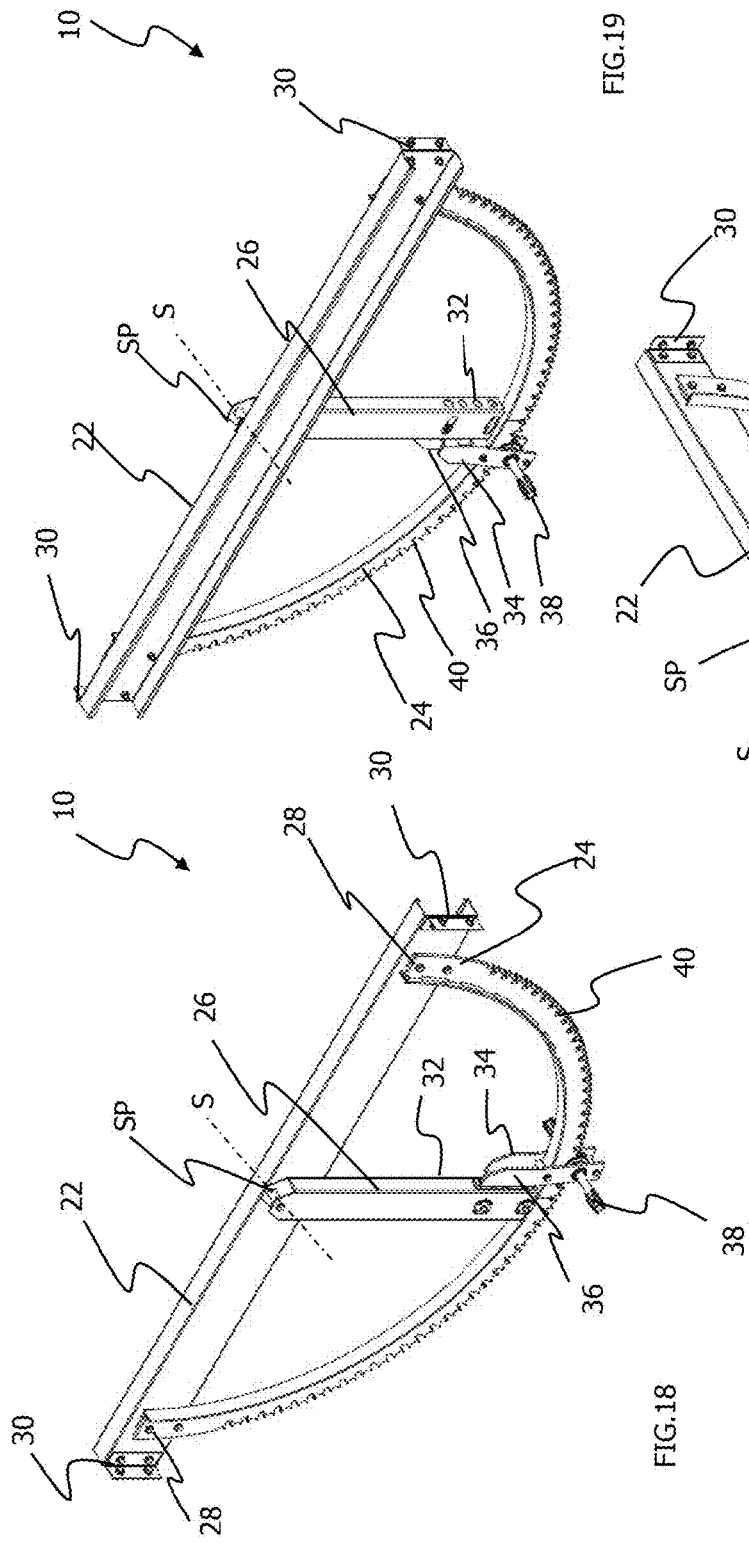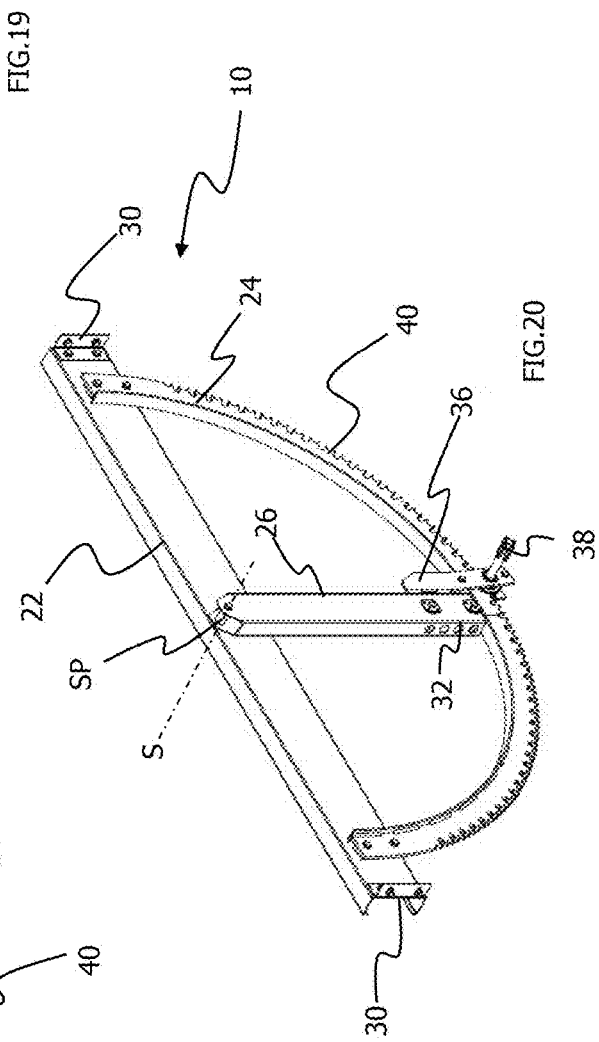

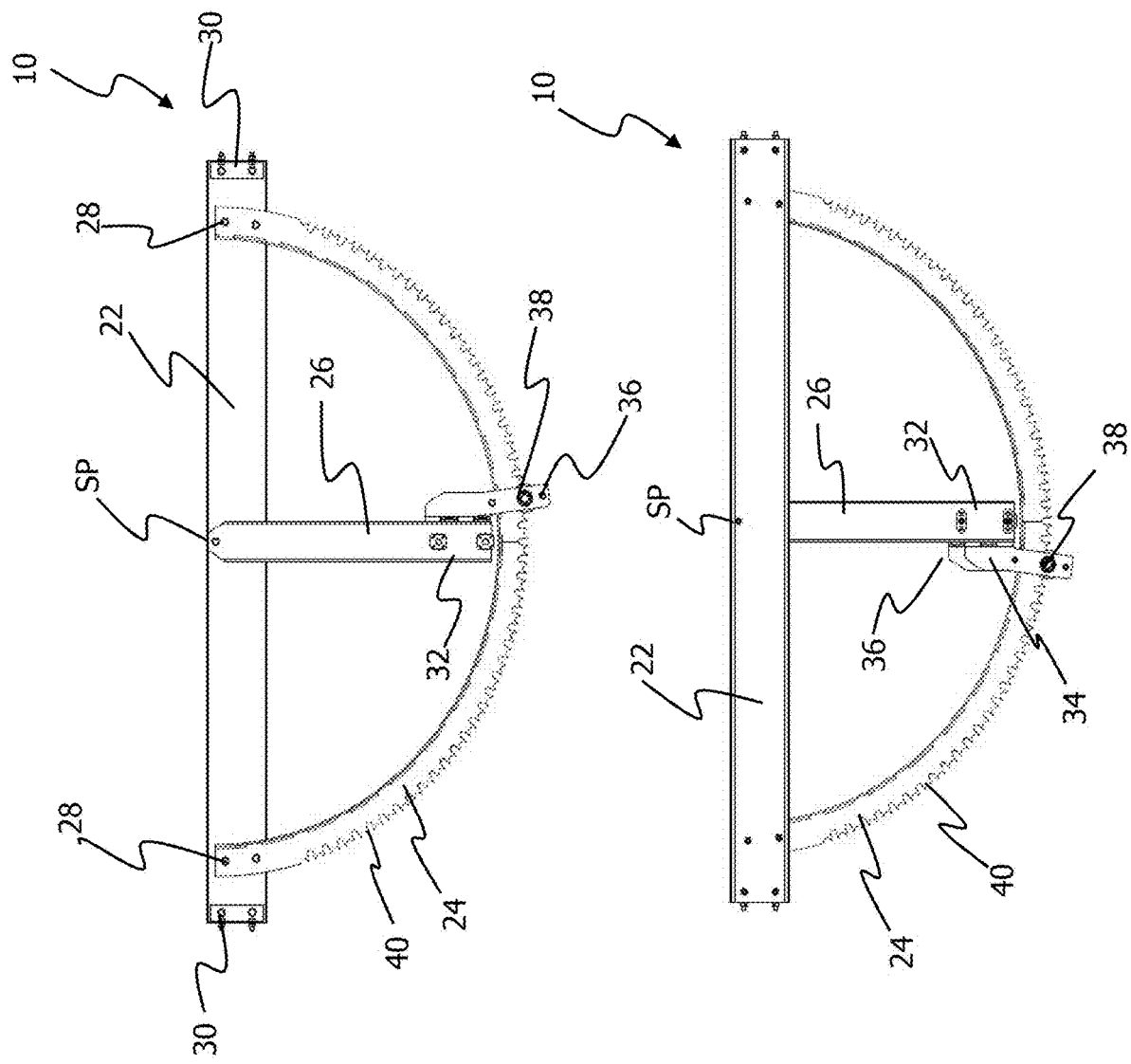

PIVOTING UNIT FOR A TRACKING APPARATUS FOR SOLAR MODULES

FIELD OF THE INVENTION

The present invention relates to a pivoting unit for a tracking apparatus for solar modules. Furthermore, the present invention relates to a tracking apparatus comprising at least one such pivoting unit. The invention is also directed to an assembly method for a tracking apparatus.

BACKGROUND OF THE INVENTION

Tracking apparatuses for solar modules are known from the prior art and are disclosed, for example, in WO 2016/192766 A1. Document WO 2016/192766 A1 discloses a tracking apparatus for solar modules comprising a row of posts arranged along a longitudinal axis. A cross member is pivotally mounted on each post, the cross members being pivotable about a common pivot axis running parallel to the longitudinal axis. A ring gear is fastened to each cross member, the teeth of which mesh with a motor-driven gearwheel mounted on the respective post. The gearwheel and the ring gear must be secured against transverse displacement by separate devices.

BRIEF SUMMARY OF THE INVENTION

It is an objective of the present invention to provide a pivoting unit for a tracking apparatus for solar modules, which has a simplified structure, enables quick and easy assembly and can prevent damage to the pivoting unit and components connected to it.

This objective is achieved with a pivoting unit for a tracking apparatus for solar modules with the features of a pivoting unit for a tracking apparatus for solar modules, comprising at least one cross member pivotable about a pivot axis, at least one drive arch connected to the at least one cross member, which comprises a plurality of drive recesses and a plurality of retaining recesses, and at least one rotatably mounted drive device. The at least one drive device being designed such that it engages in at least one of the drive recesses of the drive arch for pivoting the at least one cross member, and wherein the at least one drive device is designed such that it engages in at least one of the retaining recesses in order to hold the cross member in a pivot position. The at least one drive device is designed such that the at least one drive device alternately engages in at least one of the drive recesses and in at least one of the retaining recesses. The drive device comprises at least one eccentrically arranged drive element which engages in at least one of the drive recesses of the drive arch for pivoting the at least one cross member, wherein the at least one drive device comprises at least one retaining element which engages in at least one of the retaining recesses of the drive arch in order to hold the at least one cross member.

According to further embodiments, the pivoting unit comprises at least one support element for connecting the pivoting unit to at least one post which is anchored or can be anchored in or on the ground, the at least one cross member being pivotally connected about the pivot axis to the at least one support element. In another embodiment, the at least one drive device is designed such that it forms at least one selected from the group comprising an axial and radial guide for the at least one drive arch. In another embodiment, the pivoting unit comprises at least one guide device which guides the drive arch in the radial direction. In another embodiment, at least one selected from the group comprising the at least one drive element and the at least one retaining element extend essentially parallel to the axis of rotation of the drive device. In another embodiment, the at least one drive device comprises at least one coupling section for coupling the drive device to at least one selected from the group comprising a drive of a tracking system and to a further pivoting unit. In another embodiment, the at least one coupling section is designed to compensate for at least one selected from the group comprising angular misalignments and/or to compensate for tolerances in the direction of the pivot axis. In another embodiment, the at least one drive device comprises at least one connecting element which connects the at least one coupling element to the at least one drive element and the at least one retaining element. In another embodiment, the at least one drive device comprises two connecting elements which are designed for axially guiding the drive arch. In another embodiment, at least one selected from the group comprising the at least one drive element and the at least one retaining element extend between the two connecting elements. In another embodiment, the pivoting unit comprises at least one fastening element for attaching the at least one drive device to the at least one support element or the at least one post. the at least one drive device being rotatably mounted on the at least one fastening element. In another embodiment, the at least one drive element is oval, lenticular, elliptical or circular in cross-section. In another embodiment, the at least one drive device extends at least in sections through the at least one support element. In another embodiment, the at least one drive device is arranged within at least one support element, or wherein the at least one drive device is arranged between at least two support elements. In another embodiment, the at least one drive shaft or a corresponding adapter is designed to compensate for at least one selected from the group comprising angular misalignments and tolerances in the direction of the pivot axis.

In another embodiment, a tracking apparatus for solar modules is provided comprising at least one pivoting unit as described above, which is arranged on at least one post which is anchored or can be anchored in or on the ground. In another embodiment, the at least one pivoting unit is at least one selected from the group comprising coupled to at least one further pivoting unit and a drive via at least one drive shaft. In another embodiment, the pivoting unit is coupled to the at least one drive shaft via the at least one coupling section of the at least one drive device. In another embodiment, the at least one drive device is coupled to the at least one drive shaft via at least one adapter. In another embodiment, at least one selected from the group comprising the at least one support element and the at least one post have at least one connecting section via which the at least one support element and the at least one post are connected to one another. In another embodiment, at least one selected from the group comprising the at least one connecting section of the at least one support element and the at least one post is formed to compensate for at least one selected from the group comprising a misalignment in the direction of the pivot axis and to compensate for a misalignment transverse to the pivot axis.

In another embodiment, an assembly method is provided for a tracking apparatus comprising the steps of assembling a pivoting unit comprising at least one cross member pivotable about a pivot axis; at least one drive arch connected to the at least one cross member, which comprises a plurality of drive recesses and a plurality of retaining recesses; and at least one rotatably mounted drive device, the at least one drive device being designed such that the at least one drive device engages in at least one of the drive recesses of the drive arch for pivoting the at least one cross member, and wherein the at least one drive device is designed such that the at least one drive device engages in at least one of the retaining recesses in order to hold the cross member in a pivot position, wherein the at least one drive device is designed such that the at least one drive device alternately engages in at least one of the drive recesses and in at least one of the retaining recesses, wherein the drive device comprises at least one eccentrically arranged drive element which engages in at least one of the drive recesses of the drive arch for pivoting the at least one cross member, wherein the at least one drive device comprises at least one retaining element which engages in at least one of the retaining recesses of the drive arch in order to hold the at least one cross member; and connecting the assembled pivoting unit to posts which are anchored or can be anchored in or on the ground. In another embodiment, connecting at least one selected from the group comprising support rails and support frames to the at least one pivoting unit; and connecting at least one solar module to at least one selected from the group comprising support rails and support frame. In another embodiment, at least one selected from the group comprising connecting the at least one pivoting unit to a drive; and connecting the at least one pivoting unit to another pivoting unit via at least one drive shaft.

The pivoting unit for a tracking apparatus for solar modules comprises at least one cross member pivotable about a pivot axis, at least one drive arch connected to the at least one cross member, which comprises a plurality of drive recesses and a plurality of retaining recesses, and at least one rotatably mounted drive device. The rotatably mounted drive device is designed such that it engages in at least one drive recess of the drive arch for pivoting the at least one cross member. In addition, the drive device is designed such that it engages in at least one of the retaining recesses in order to hold the cross member in a pivot position.

The drive device is designed such that it engages alternately in one of the drive recesses and in one of the retaining recesses. If the at least one drive device is in engagement with one of the retaining recesses, the cross member and the drive arch connected to it can be held in their set pivot position without a torsional moment being transmitted to a connected drive or a drive shaft connected to the pivoting unit. As a result, the components for driving the pivoting unit, such as the drive shaft and/or the drive, can be relieved. Furthermore, wind-induced vibrations in the pivoting unit and the components connected to it can also be prevented. Such vibrations can cause damage to the pivoting unit, the solar modules attached to it and other components connected to the pivoting unit. These vibrations can be avoided by the rigid connection of the drive arch to the at least one drive device when the drive device is in engagement with one of the retaining recesses.

The pivoting unit has a simplified structure, which allows for a quick and easy assembly. The pivoting unit can be preassembled as an independent unit. The preassembly takes place independently of the post or posts for anchoring the tracking apparatus in the ground. The pivoting unit can be assembled, for example, in a factory hall. The preassembled pivoting unit then only has to be connected to the post or posts at the place of use of the tracking apparatus in order to complete the assembly. The posts can be anchored in or on the ground beforehand and independently of the pivoting unit. The fact that the pivoting unit can be preassembled makes assembly on site considerably easier.

The retaining recesses can be curved or arched. The drive recesses can extend further into the drive arch in the radial direction than the retaining recesses. The radially outermost points of the retaining recesses can lie on the outer radius of the drive arch. These radially outermost points can form the transition from the retaining recess into the next drive recess. The drive recesses can be designed in the form of incisions or slots in the drive arch. The drive recesses can extend into the drive arch from the outside or inside radius with a predefined radial extent. The curved retaining recesses can also extend into the drive arch with a predetermined radial extent from the outside or inside radius. The drive recesses can widen in the radial direction. The distance between two opposite flanks of a drive recess can thus increase in the radial direction.

The rotatably mounted drive device comprises at least one eccentrically arranged drive element which engages in the drive recesses of the drive arch for pivoting the at least one cross member. In this context, "eccentrically arranged" is to be understood to mean that the drive element is at a radial distance or is offset from the axis of rotation of the drive device. The drive element can extend parallel to the axis of rotation of the drive device. The at least one drive element can rotate with a predetermined radial distance on a circular path about the axis of rotation of the drive device. The drive element can have a longitudinal axis or central axis, which extends at a radial distance parallel to the axis of rotation of the drive device. The axis of rotation of the drive device extends essentially parallel to the pivot axis. At least one drive shaft or drive rod connected to the drive device can also extend essentially parallel to the pivot axis.

By engaging the at least one drive element in the at least one drive recess, the drive device and the driven unit are coupled in a torque-transmitting manner in such a way that when the drive arrangement is rotated, a gradual pivoting or adjusting movement of the drive arch and the cross member attached to it about the pivot axis may occur. A continuous rotary movement of the drive device about the axis of rotation can accordingly lead to a gradual pivoting or adjusting movement of the drive arch and the cross member attached to it. The pivoting or adjusting movement of the drive arch and the cross member attached to it is always carried out when the at least one drive element is in engagement with one of the drive recesses. When the drive device rotates, the at least one drive element can engage in one of the drive recesses, take the drive arch and the cross member with it and then leave the drive recess again. Between the engagement of the drive element in the drive recess and the leaving of the drive recess by the drive element, the at least one drive element presses against a wall of the drive recess, as a result of which a torque is exerted on the drive arch and the cross member, which leads to a pivoting or adjusting movement of the drive arch and the cross member.

The pivoting unit can comprise at least one support element for connecting the pivoting unit to a post which can be anchored in or on the ground. The posts can be rammed into the ground or connected to the ground via a foundation. For example, foundation elements anchored in the ground can be used. The at least one cross member can be connected to the at least one support element so as to be pivotable about the pivot axis. The support element and the cross member can define the pivot point through which the pivot axis extends. In the starting position and/or in the mounting position of the pivoting unit, the support element can extend perpendicular to the cross member. The support element can be connected at its end opposite the pivot point to a post which can be anchored or is anchored in or on the ground. The drive unit can also be attached to this end. In the assembled state, the cross member and the drive arch connected to it can be pivoted relative to the support element by means of the drive device.

The at least one drive device can be designed such that it forms a guide for the at least one drive arch. The drive device can guide the drive arch in the axial and/or radial direction in order to prevent the drive device from disengaging from the drive arch. The drive device can be designed in such a way that it can prevent the drive arch from deflecting in the axial direction. For this purpose, the drive device can have sections or elements that extend perpendicular to its axis of rotation.

The pivoting unit can also comprise at least one guide device which guides the at least one drive arch in the radial direction. The at least one guide device can comprise a guide roller on which the at least one drive arch can be supported in the radial direction. The drive arch can be held approximately in its predetermined radial position with the at least one guide device, in which the engagement between the drive device and the drive arch can be ensured.

The at least one drive device can comprise at least one retaining element. The at least one retaining element can extend parallel to the at least one drive element at a radial distance. The retaining element can interact with one of the retaining recesses of the drive arch in order to hold the drive arch and the cross member connected to it in a set pivot position. The retaining element has a cross section or a contour which, together with the retaining recesses, can prevent the drive arch from being able to be moved relative to the drive device when the retaining element is in engagement with the retaining recess.

The at least one retaining element always engages in a retaining recess when the at least one drive element is not in engagement with the at least one drive recess. The at least one retaining element can positively engage in the at least one retaining recess. In this state, the drive arch can be held in its set position. The drive device and the drive arch are thus in a locked position. In the locked position, the drive arch is prevented from rotating about its axis of rotation or its pivot axis. The retaining element engages with a first section of its cross section in the retaining recess, this section increasing continuously due to the rotary movement of the drive device. As soon as the at least one retaining element even only partially engages in the retaining recess, rotation of the drive arch and of the cross member attached to it about the pivot axis can be prevented. If the drive device is driven further, the retaining element leaves the retaining recess and releases the drive arch for an adjustment step initiated by the drive element.

If the drive device is driven further, the retaining element and the drive element continue to rotate so that the drive element can be brought into engagement with the next drive recess. For example, the drive element can be rotated by 90° to 270° after leaving a drive recess about the axis of rotation of the drive arrangement in order to engage in the next drive recess. At the same time, the at least one retaining element rotates about the same or a similar angle of rotation in the retaining recess and leaves the retaining recess as soon as the drive element engages in the next drive recess.

The at least one retaining element and/or the at least one drive element can extend essentially parallel to the axis of rotation of the drive device. The drive recesses and the retaining recesses can be designed to correspond to the shape or the cross section of the drive element and the retaining element.

The at least one drive device can comprise at least one coupling section for coupling to a drive of a tracking apparatus and/or further pivoting units. The coupling section can be designed to be complementary to a coupling section of a drive shaft or a drive rod. The coupling section can be designed to produce a positive and/or non-positive connection with a coupling section of a drive shaft or a drive rod. The coupling section of the drive device can be provided with at least one flattened portion. Furthermore, the coupling section can comprise at least one projection extending in the radial direction. The at least one radial projection can engage in a recess in a drive shaft or a drive rod in order to produce a positive and/or non-positive connection for transmitting torque from the drive shaft to the drive device. It is also conceivable that the drive shaft comprises at least one radial projection which engages in at least one recess in the drive device for producing a positive and/or non-positive connection. The at least one coupling section of the drive device can comprise at least one recess with a predetermined cross section. At least one complementary section of the drive shaft or drive rod can engage in the recess of the coupling section. The recess can for example be provided with a flat, hexagonal, square or multi-tooth cross section. The corresponding section of the drive shaft, which is complementary to the recess, can be designed, for example, in the form of a flat shape, a hexagon or multi-tooth and can be inserted into the recess. It is also conceivable to provide a flat, hexagonal or multi-toothed section on the drive device which interacts with a recess having a flat, hexagonal, square or multi-tooth cross section in the drive shaft or the drive rod.

The at least one drive device can comprise at least one bearing section with which the drive device can be rotatably mounted in a bearing point. The bearing points can be formed, for example, in fastening elements via which the drive device is connected to the at least one support element and/or the at least one post. Furthermore, the bearing points can be formed in or on the support element or the support elements. The bearings can also be formed on the post or posts. The bearing section can be arranged in the direction of the axis of rotation between the drive element and the coupling section.

The at least one coupling section can also be designed to compensate for an angular misalignment. In particular, the at least one coupling section can be designed to compensate for an angular misalignment between the drive device and a drive and/or a drive shaft. For this purpose, the at least one coupling section can have, for example, an outer and/or inner surface that is curved at least in sections in the direction of the axis of rotation of the drive device. The curved outer surface can be provided on the at least one radial projection, which is used for coupling to a drive shaft or a drive. The at least one coupling section of the drive device can comprise at least one recess into which a section of the drive shaft or at least one projection on the drive shaft engages. The at least one recess of the coupling section and/or the corresponding section of the drive shaft can also be designed with curved surfaces which serve to compensate for an angular misalignment. The recess can be provided with a hexagonal cross section, for example. In this case, the corresponding section of the drive shaft or the drive rod can be designed in the form of a hexagon. The surfaces of the hexagonal cross section of the recess and/or the outer surfaces of the hexagon of the drive shaft can be curved in order to be able to compensate for an angular misalignment. It is conceivable to provide a hexagonal section on the drive device with curved outer surfaces, which interacts with a recess having a hexagonal cross section with possibly also curved surfaces in the drive shaft or the drive rod.

The at least one coupling section and/or the end of the drive shaft can be designed to compensate for tolerances in the direction of the pivot axis. The at least one coupling section and a section of a drive shaft can be complementary, so that they can be brought into engagement with one another. The at least one coupling section and/or the corresponding at least one section of the drive shaft can be designed and/or dimensioned in such a way that assembly-related distance tolerances between adjacent pivoting units and/or juxtaposed posts can be compensated to a limited extent.

The at least one drive device can comprise at least one connecting element which connects the coupling section to the drive element. The at least one connecting element can extend perpendicular to the axis of rotation of the drive arrangement. The connecting element can be, for example, cam-shaped or disk-shaped. The at least one drive device can comprise two connecting elements. The two connecting elements can form an axial guide for the drive arch. The two connecting elements can enclose the at least one drive arch in sections in the axial direction between them. The at least one drive element and/or the at least one retaining element can extend between the two connecting elements. The drive element and the retaining element can extend in the axial direction.

The pivoting unit can have at least one fastening element for attaching the at least one drive device to the at least one support element and/or post. The at least one drive device can be rotatably mounted on the at least one fastening element. The fastening element can be provided with an opening which forms at least one bearing point for the drive element. At least one bearing section of the drive element can be accommodated in the opening at least in sections. A bearing bush can be arranged in the opening.

The at least one drive element can have a circular cross section. The at least one drive element can have a cross section that deviates from a circular cross section. The cross section can be oval or lenticular. The oval or lenticular cross section of the drive element can ensure that the drive element engages securely in the drive recesses of the drive arch. In particular, tolerance fluctuations within the pivoting unit can thereby be compensated for. If, for example, the radial distance between the drive device and the drive arch increases due to tolerance fluctuations, the engagement of the drive element in the drive contour of the drive arch can be ensured by the oval or lenticular shape of the drive element.

The at least one drive device can extend at least in sections through the at least one support element. For this purpose, the support element can comprise a recess or an opening. The support element can comprise at least one bearing point which can be used to support the at least one drive device on the support element. The at least one bearing point can be formed in a recess or an opening in the support element. The drive element and the retaining element of the drive device can be arranged within the cross section of the support element. The drive contour of the drive arch can engage with the drive device within the cross section of the support element. As a result, the area of engagement between the drive arch and the drive device can be protected from the weather. The at least one drive device can be arranged within a support element. Furthermore, the at least one drive device can be arranged between two support elements. Each of the support elements can comprise a bearing point in which the drive device is mounted. The bearing points can be bearing flanges. Furthermore, the bearing points can be designed in the form of bearing projections.

A bearing flange can be a separate component and, for example, screwed to the at least one support element or connected in some other way. At least one bearing projection can be formed on the at least one support element. The at least one bearing flange or the at least one bearing projection can each comprise a recess for receiving the bearing sections of the drive device. The bearing points can be provided with plain bearings, for example.

The at least one drive device of the pivoting unit can be coupled to the at least one drive shaft or a drive via at least one adapter. In this case, the at least one coupling section of the drive device can be coupled to the adapter, which in turn is coupled to the drive shaft or the drive rod or the drive.

The present invention further relates to a tracking apparatus for solar modules comprising at least one pivoting unit of the type described above and at least one post which can be anchored or is anchored in or on the ground.

The at least one pivoting unit can be coupled to at least one further pivoting unit and/or a drive of the tracking apparatus via at least one drive shaft. The at least one pivoting unit can also be coupled directly to a drive without a drive shaft. The drive can be attached between two or more pivoting units or at the end of an arrangement of several coupled pivoting units. The drive can be a motor such as an electric motor. The pivoting unit can be coupled to the at least one drive shaft via the at least one coupling section of the at least one drive device. The coupling section can be coupled directly to a drive. Support rails or support frames for attaching solar modules can be attached to the cross member. The support frames can be composed of cross members and support rails. The at least one support element can be connected with its end opposite the pivot axis to the post which can be anchored or is anchored in or on the floor.

The at least one support element and/or the post can comprise at least one connecting section via which the at least one support element and the at least one post can be connected to one another. The at least one connecting section of the at least one support element and/or the at least one post can be designed to compensate for a misalignment in the direction of the pivot axis. The at least one connecting section of the at least one support element and/or the at least one post can furthermore be designed to compensate for a misalignment occurring transversely to the pivot axis, i.e., a misalignment occurring in the vertical direction and/or horizontal direction. In order to be able to compensate for misalignments transverse to the pivot axis, a plurality of openings can be formed in the connecting section of the at least one post and/or in the connecting section of the at least one support element, via which the position of the pivoting unit on the post which is suitable for compensating the misalignment can be selected. The at least one support element can be connected to the post by means of at least one connecting element extending through a corresponding opening and thus assume the position suitable for compensating for the misalignment.

The misalignments mentioned can arise, for example, from tolerances and/or differing distances between adjacent pivoting units or between adjacent posts. Furthermore, a misalignment can also be caused by uneven terrain in which a tracking apparatus is to be set up.

The present invention further relates to an assembly method for a tracking apparatus. The assembly method comprises the steps of:
- preassembling the pivoting unit, and
- connecting the pivoting unit to posts which are anchored or can be anchored in or on the ground.

An anchoring step may be carried out before the connecting step, in which the posts are anchored in or on the ground. In the case of several pivoting units, the individual pivoting units can be connected to one another via drive shafts in a further step. The pivoting units can be pivoted via a drive that is coupled to the drive shafts.

The method may further include the following steps:
- connecting support rails and/or support frames with the at least one pivoting unit, and
- connecting at least one solar module to the support rails and/or support frame.

The assembly method may further comprise at least one of the following steps:
- connecting the at least one pivoting unit to a drive, and/or
- connecting the at least one pivoting unit to a further pivoting unit via at least one drive shaft.

BRIEF DESCRIPTION OF THE SEVERAL VIEWS OF THE DRAWING

Exemplary embodiments of the present invention are described below with reference to the attached figures. They represent:

FIGS. 3 to 7 different views of a pivoting unit according to a first embodiment;

FIGS. 18 to 22 different views of a pivoting unit according to a second embodiment of the invention;

DETAILED DESCRIPTION OF THE INVENTION

Figure 1:
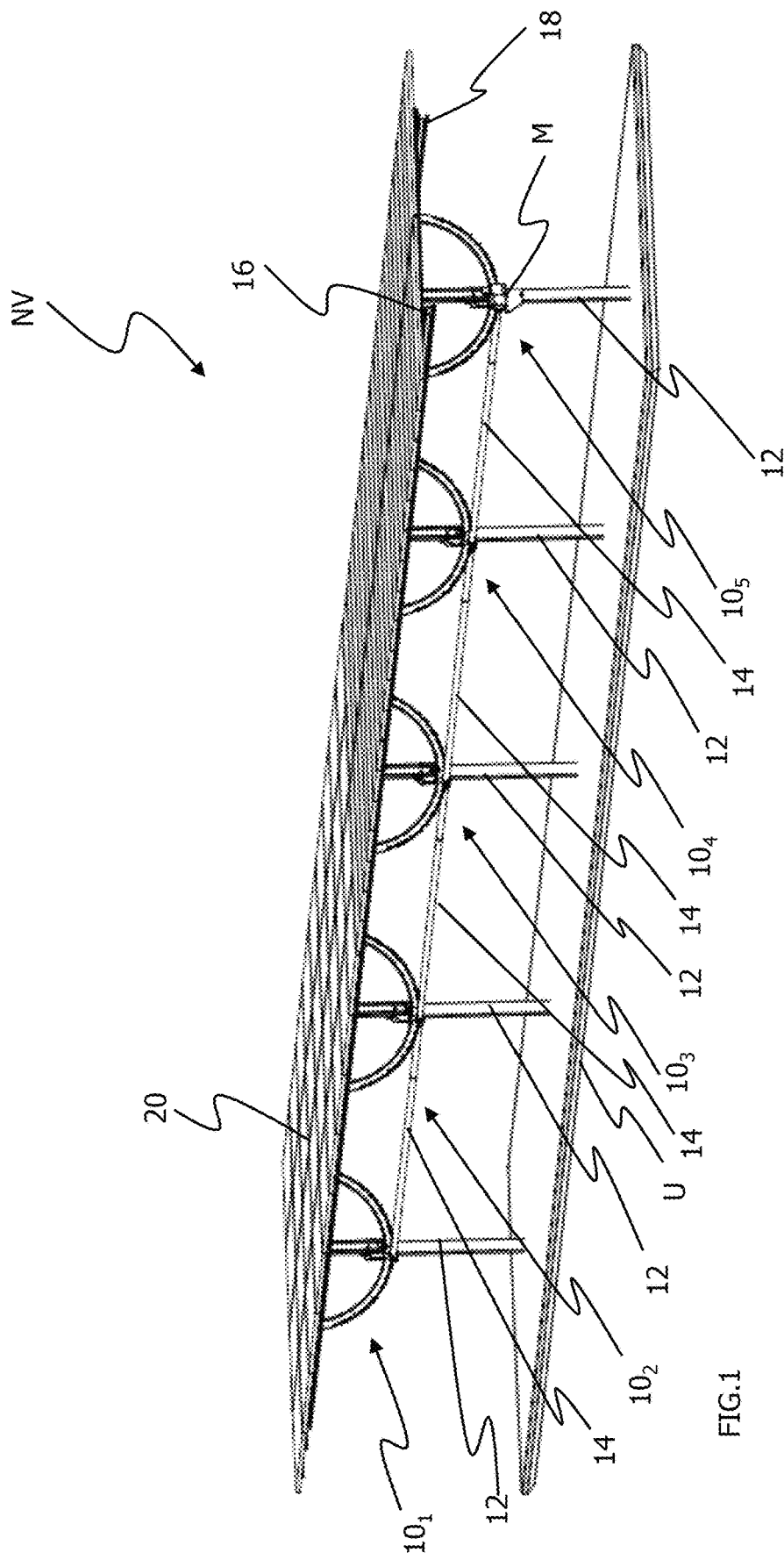
FIGS. 1 and 2 perspective views of a tracking system for solar modules according to an embodiment.

FIG. 1 shows a perspective view of a tracking apparatus for solar modules. The tracking apparatus is generally designated with NV. The tracking apparatus NV comprises a plurality of pivoting units 101 to 105. Each of the pivoting units 101 to 105 is connected to a post 12 anchored in the ground U. The pivoting units 101 to 105 are interconnected via the drive shafts 14. The drive shafts 14 are driven by a motor M disposed in FIG. 1 on the pivoting unit 105. In this way, several pivoting units 101 to 105 can be driven with a single drive. The pivoting units 101 to 105 are also connected to one another via support rails 16 and 18, to which solar modules 20 can be attached with the aid of fastening elements. To align the solar modules 20 with the sun, the pivoting units 101 to 105 are driven via the drive shafts 14, as a result of which the pivoting units 101 to 105 can pivot the solar modules 20 attached to them.

Figure 2:
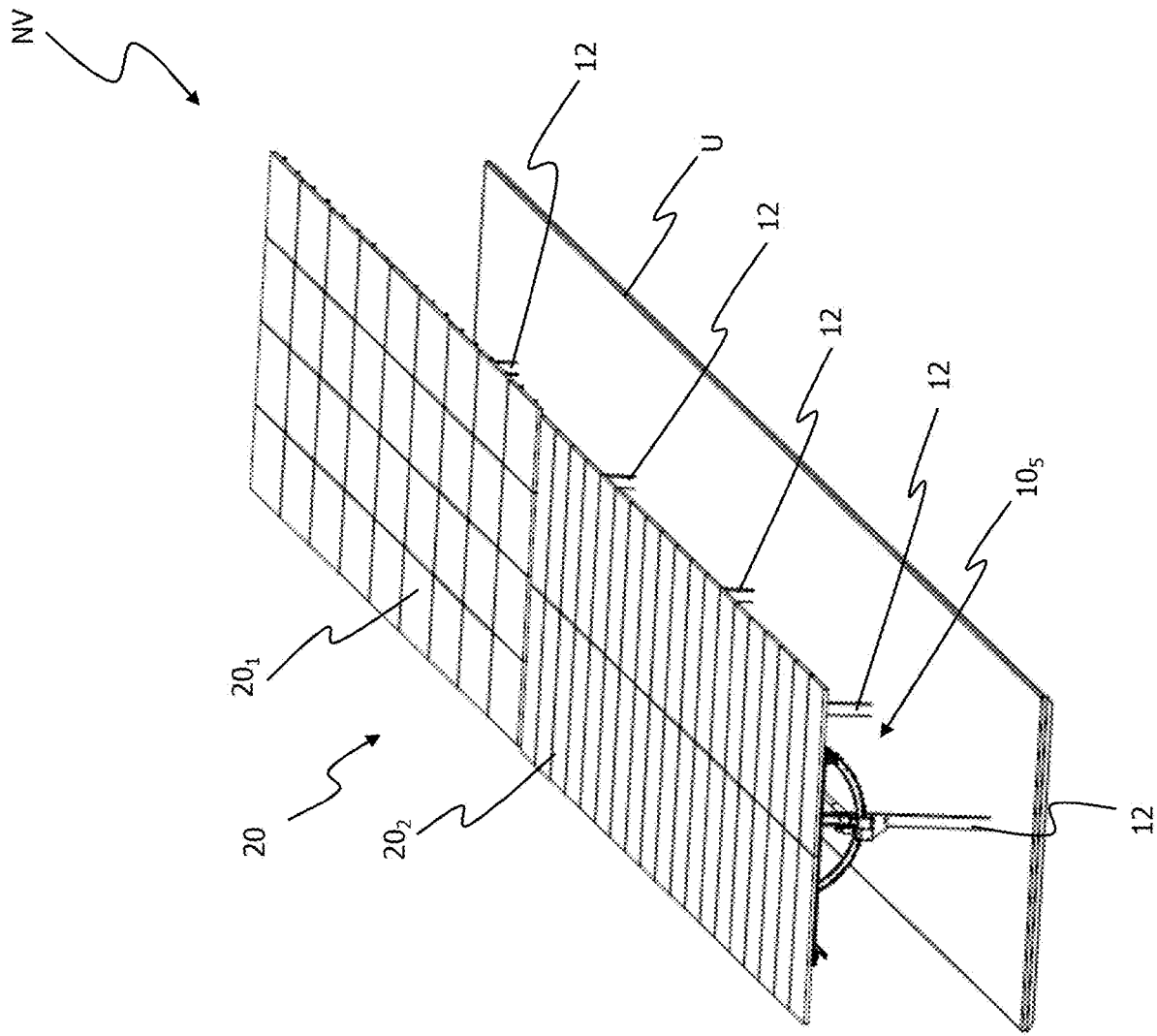

FIG. 2 shows a further perspective view of the tracking apparatus NV, in which the solar modules 20 and the pivoting unit $10_5$ arranged on a post 12 and the posts 12 of the further pivoting units $10_1$ to $10_4$ are shown. Solar modules 20 with different shapes, sizes, orientations and also solar modules 20 of different types of construction can be attached to the tracking apparatus NV, as illustrated in FIG. 2 by the differently represented solar modules $20_1$ and $20_2$.

FIGS. 3 to 5 show different perspective views of a pivoting unit 10 according to a first embodiment. The pivoting unit 10 comprises a cross member 22, a drive arch 24 attached to the cross member 22 and a support member 26.

The cross member 22 and the support member 26 are pivotally connected to each other. A pivot axis S extends through the cross member 22 and the support element 26. The pivot axis S extends through the pivot point SP formed at the connection point between the cross member 22 and the support member 26.

The drive arch 24 is connected to the cross member 22 via fastening means 28 such as screws or bolts. At the ends of the cross member 22, connecting elements 30 can be seen. The cross member 22 can be connected to the support rails 16 and 18 shown in FIG. 1 via the connecting elements 30.

The support element 26 can be connected with its end 32 opposite the pivot axis S to a post 12 which can be anchored in or on the ground (see FIG. 1). Fastening elements 34 and 36 are also attached to the end 32 of the support element 26. The drive device 38 is connected to the support element 26 via the fastening elements 34 and 36. The drive device 38 serves to pivot into a new pivot position and to hold the drive arch 24 in a set position. The drive arch can be pivoted gradually. For this purpose, the drive device 38 engages with a drive contour 40 on the drive arch 24. The drive contour 40 is formed on the outside of the drive arch 24 in the radial direction.

Figure 6:
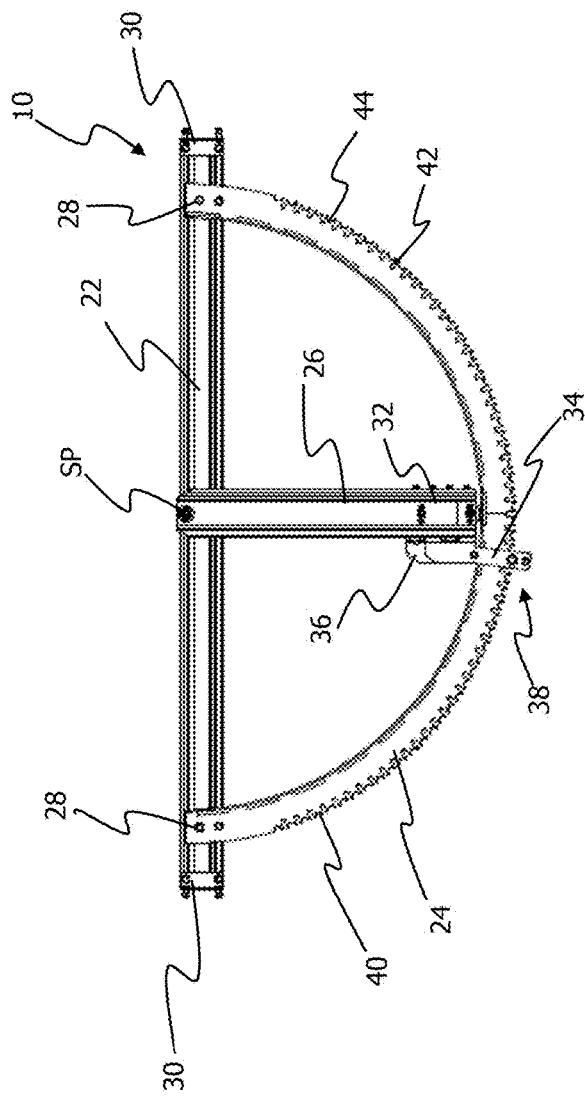
Figure 7:
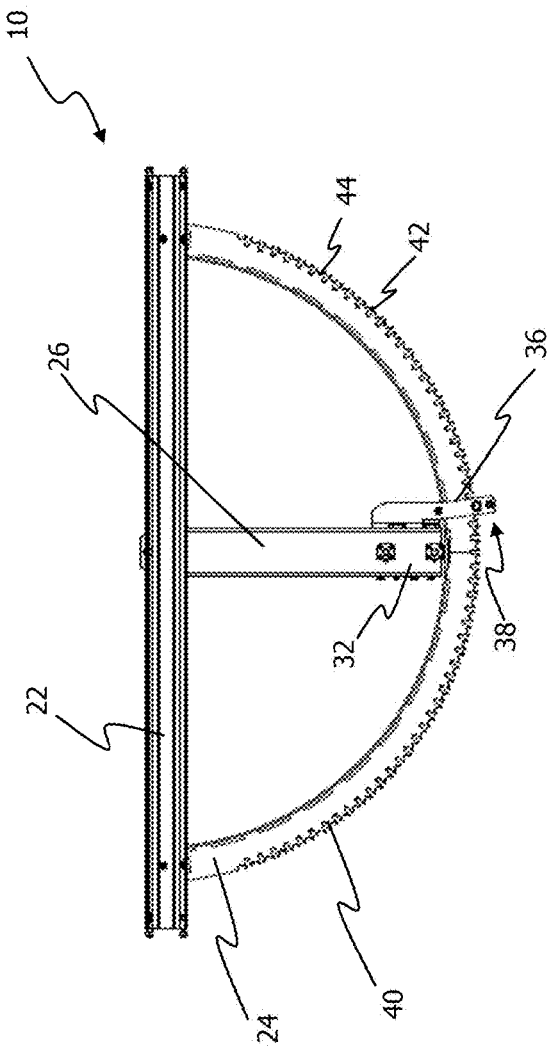

FIGS. 6 and 7 show two views of the pivoting unit 10 from opposite viewing directions. FIGS. 6 and 7 show the cross member 22, the drive arch 24 and the support member 26. In the starting position and/or the mounting position of the pivoting unit 10, i.e., the cross member 22 has not been pivoted relative to the support element 26 about the pivot point SP, the support element 26 extends perpendicular to the cross member 22. The pivot point SP is formed in the middle of the cross member 22. At the ends of the cross member 22, the connecting elements 30 are shown, which serve to connect the cross member 22 to the support rails 16 and 18 (see FIG. 1).

At the end 32 of the support element 26, which is opposite the pivot point SP, the fastening elements 34 and 36 are connected to the support element 26. The drive device 38 is rotatably mounted on the fastening elements 34 and 36. The fastening elements 34 and 36 hold the drive device 38 on the support element 26. The drive device 38 is in engagement with the drive contour 40 on the drive arch 24. The drive contour 40 comprises two different types of recesses. The drive contour 40 comprises drive recesses 42 and retaining recesses 44 which are arranged alternately in the direction of the circumference of the drive arch 24. When the drive device 38 engages in the drive recesses 42, the drive arch 24 and the cross member 22 connected to it are moved. If the drive device 38 engages in the retaining recesses 44, the drive arch 24 and the cross member 22 connected to it can be held in its set position. The drive device 38 can also change its position in engagement with one of the retaining recesses 44 in order to be able to engage in the next drive recess 42. No torsional load is transmitted to the drive shaft 14. The drive contour 40 and the drive device 38 will be discussed in more detail later in this description.

Figure 8:
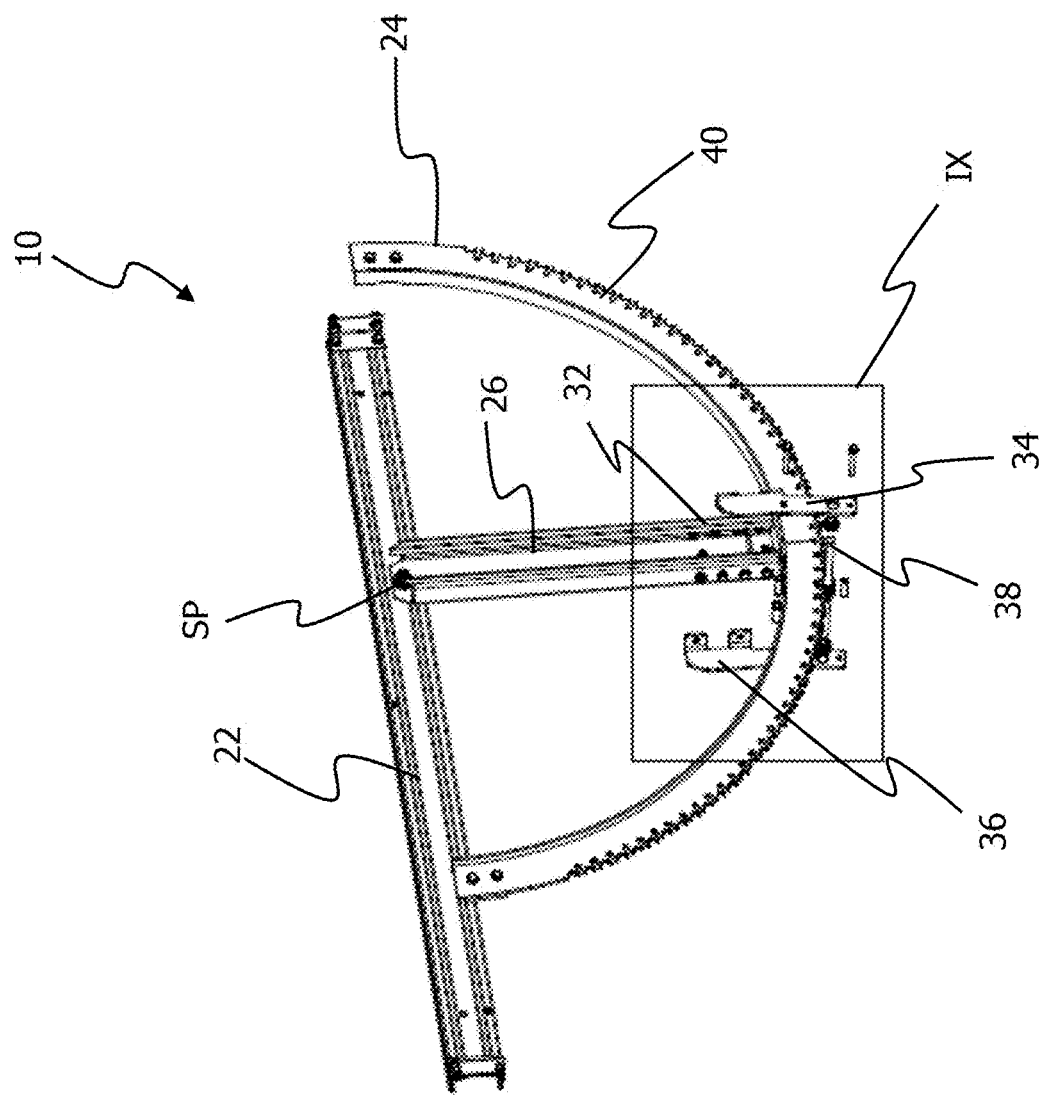
FIG. 8 an exploded view of the pivoting unit shown in FIGS. 3 to 7.

FIG. 8 shows an exploded perspective view of the pivoting unit 10. In FIG. 8, the cross member 22, the drive arch 24, the support member 26, the drive device 38 and the two fastening elements 34 and 36 are shown.

Figure 9:
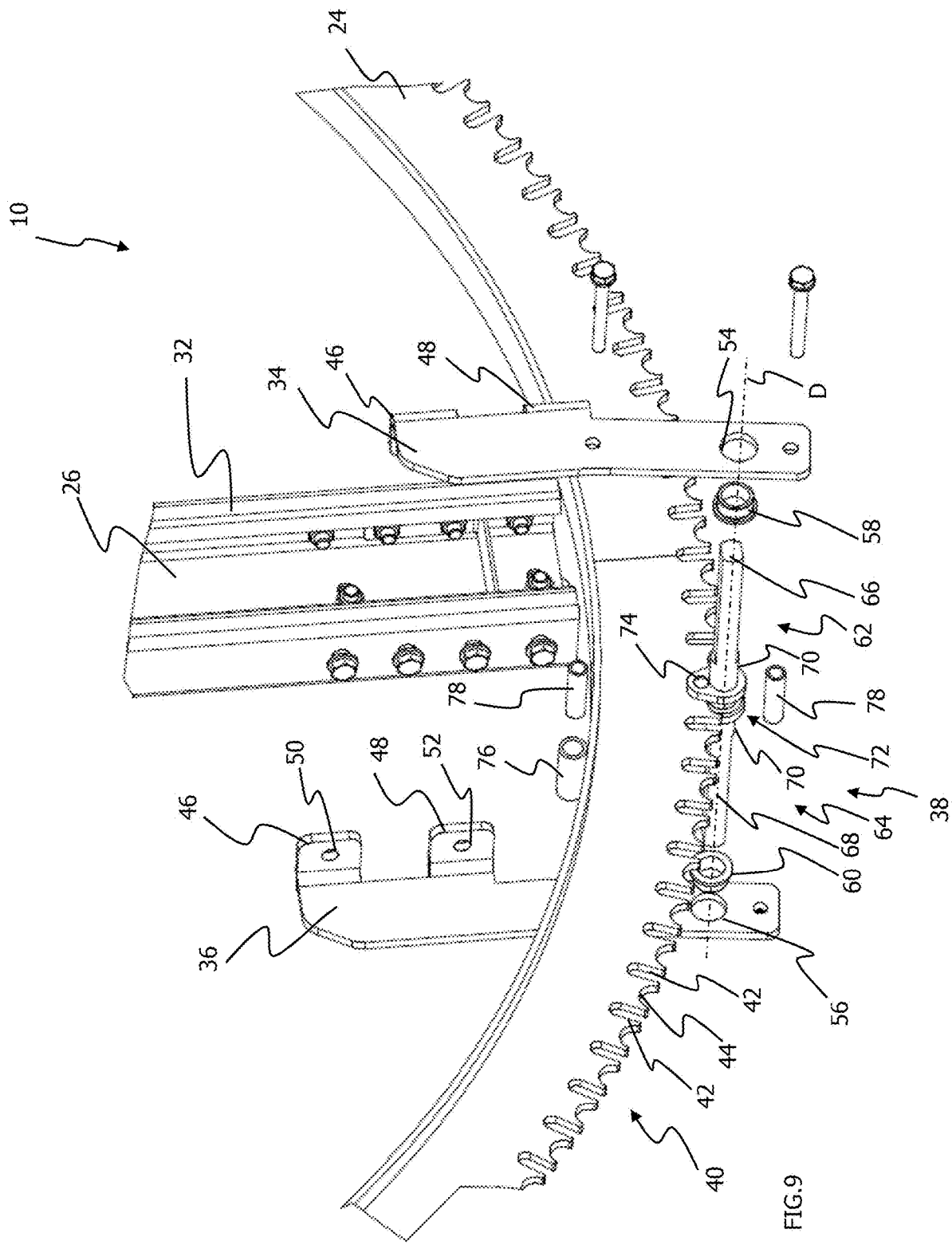
FIG. 9 an enlarged view of the section marked IX in FIG. 8.

FIG. 9 shows an enlarged view of the detail marked IX in FIG. 8. FIG. 9 shows the end 32 of the support element 26, the two fastening elements 34 and 36 and a section of the drive arch 24.

The fastening elements 34 and 36 each comprise two fastening sections 46 and 48. The fastening sections 46 and 48 are angled to the main body of the fastening elements 34 and 36. Each fastening section 46 and 48 has an opening 50, 52. The openings 50, 52 can only be seen in FIG. 9 on the fastening element 36. With these fastening sections 46 and 48, the fastening elements 34 and 36 are connected to the support element 26.

The fastening elements 34 and 36 each comprise a bearing opening 54 and 56 in which the drive device 38 can be stored. Bearing bushes 58 and 60 are provided for mounting the drive device 38 in the openings 54 and 56 and are received in the openings 54 and 56. The drive device 38 comprises two coupling elements 62 and 64. The coupling elements 62 and 64 are rod-shaped. The coupling elements 62 and 64 can be received in sections in the openings 54, 56 and/or in the bearing bushes 58, 60 arranged in the openings 54, 56. The coupling elements 62 and 64 each comprise a coupling section 66, 68 and a bearing section 70. The coupling sections 66 and 68 are provided with a cross section which is suitable for coupling to a drive shaft 14 (see FIG. 1). The drive section 72 of the drive device 38, in which the drive element 74 is provided, is formed between the coupling elements 62 and 64. The drive element 74 engages in the drive contour 40 of the drive arch 24. In the drive section 72, a retaining element is provided, which is not shown in FIG. 9. The retaining element will be discussed in detail later in this description.

The pivoting unit 10 comprises a guide element 76, which forms a guide device for the radial guidance of the drive arch 24. The drive arch 24 can be supported in the radial direction on the guide element 76. The guide element 76 thus prevents the drive arch 24 from being released from engagement with the drive device 38 in the radial direction. The guide element 76 is mounted on a spacer and/or bearing element 78. The bearing element 78 is arranged on a screw which extends between the fastening elements 34 and 36. The drive arch 24 runs between the two fastening elements 34 and 36. The fasteners 34 and 36 are connected to each other by screws. In order to establish and maintain a predetermined distance between the two fastening elements 34 and 36, the spacers 78 are provided, through which the screws extend.

Figure 10:
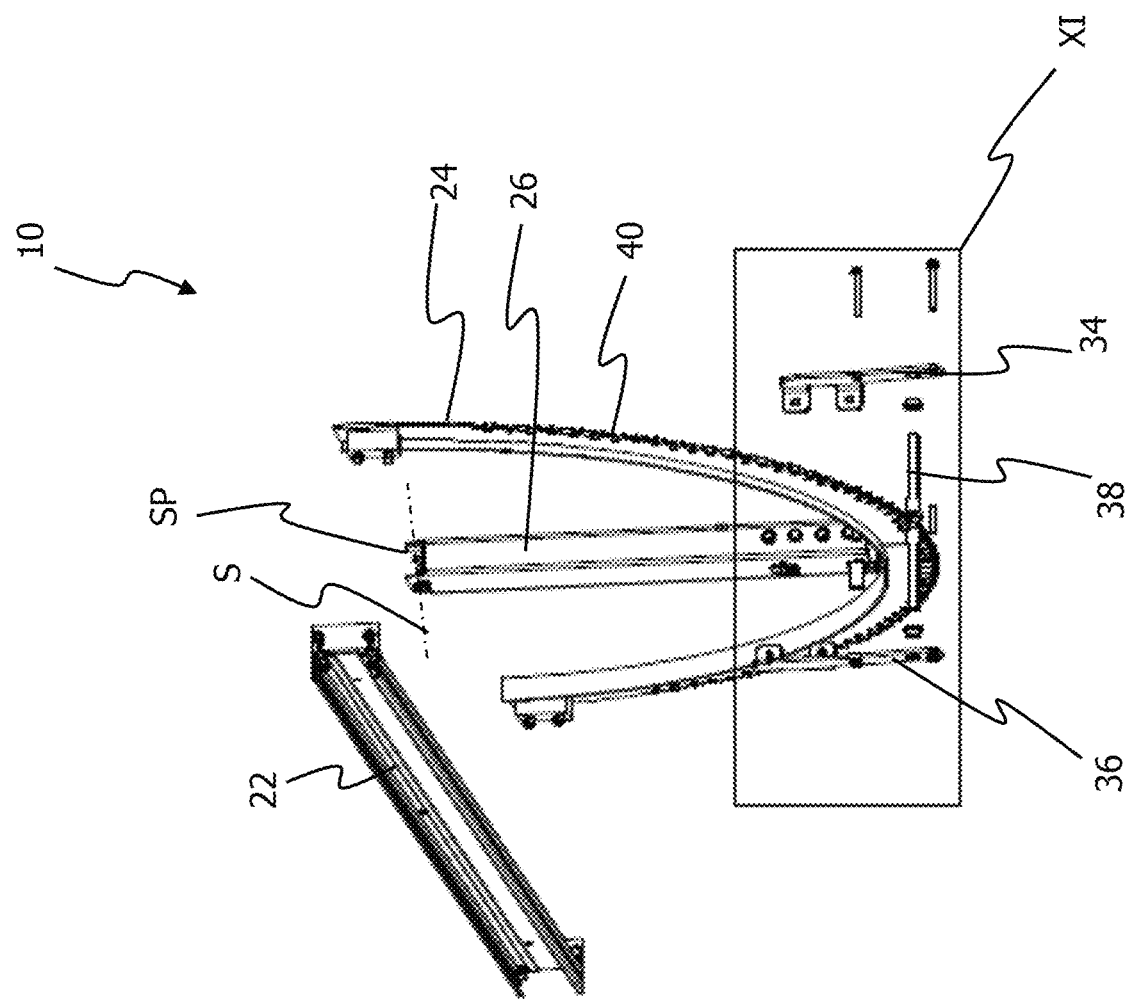
FIG. 10 a further exploded view of the pivoting unit shown in FIGS. 3 to 9.

FIG. 10 shows an exploded perspective view of the pivoting unit 10. FIG. 10 shows the cross member 22, the drive arch 24, the support member 26, the drive device 38 and the two fastening elements 34 and 36.

Figure 11:
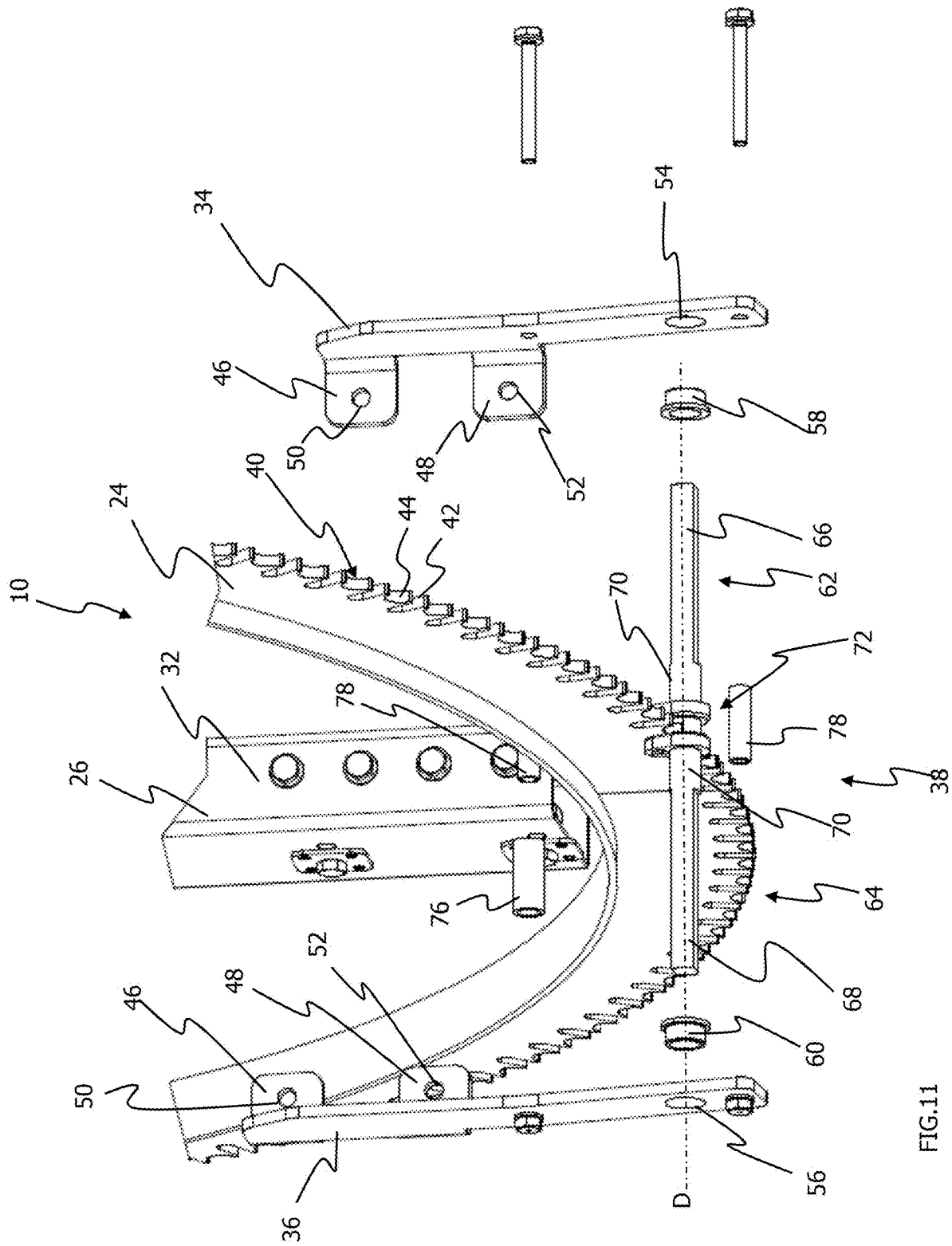
FIG. 11 an enlarged view of the section marked XI in FIG. 10.

FIG. 11 shows an enlarged view of the detail marked XI in FIG. 10. FIG. 11 shows the drive device 38, which is in engagement with the drive contour 40 of the drive arch 24, the fastening elements 34 and 36 and the end 32 of the support element 26.

The drive device 38 comprises two coupling elements 62 and 64, which extend from the drive section 72 in the opposite direction. The bearing sections 70 of the coupling elements 62 and 64 adjoin the drive section 72 in the direction of the axis of rotation D. Coupling sections 66 and 68, with their cross section designed for coupling to a drive shaft 14, follow bearing sections 70 in the direction of axis of rotation D. In the assembled state of the pivoting unit 10, the coupling elements 62 and 64 extend through the openings 54 and 56 and through the bearing bushes 58 and 60 arranged in the openings 54 and 56.

Figure 12:
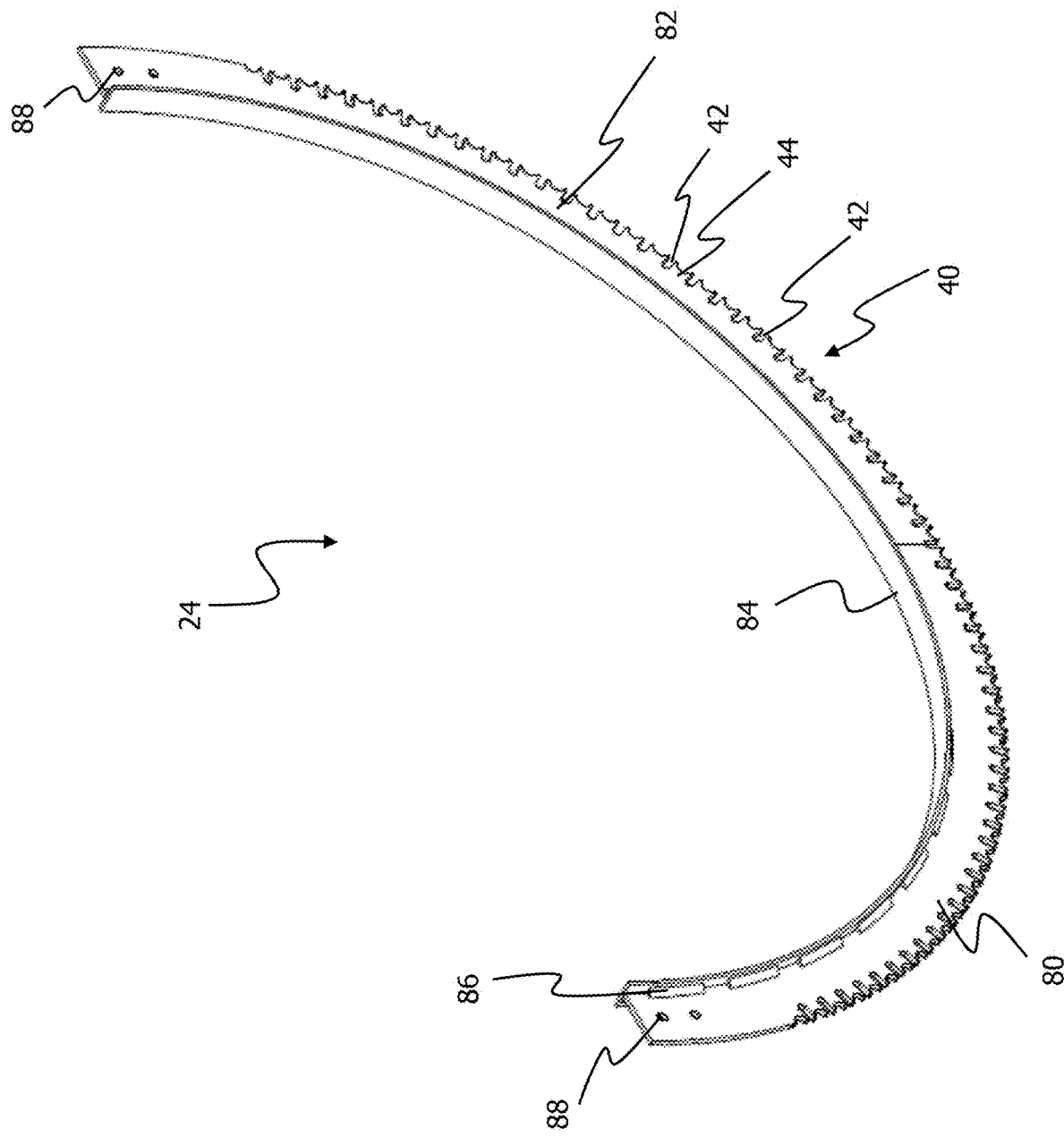
FIGS. 12 to 14 different views of a drive arch of the pivoting unit shown in FIGS. 3 to 11.
Figure 13:
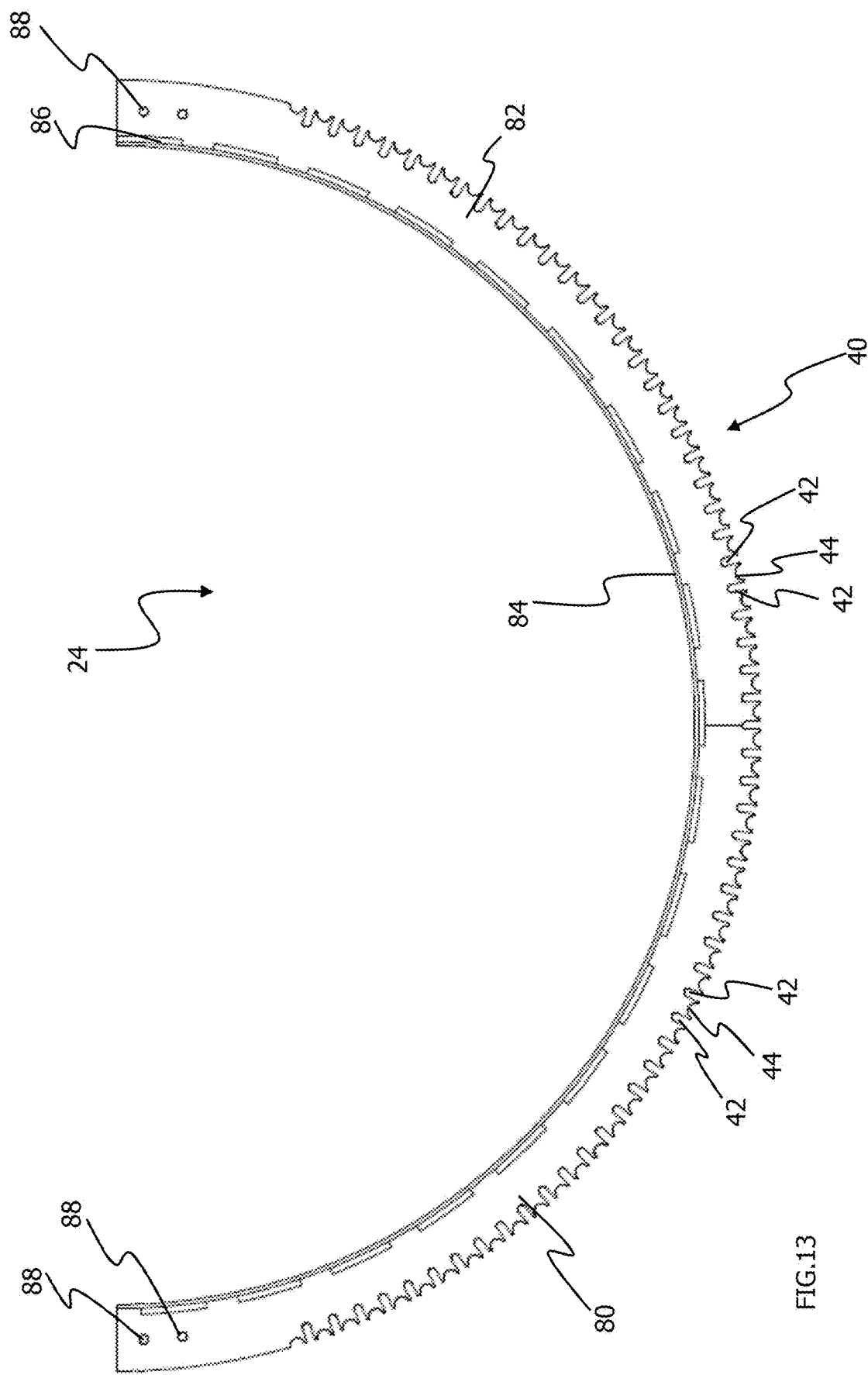
Figure 14:
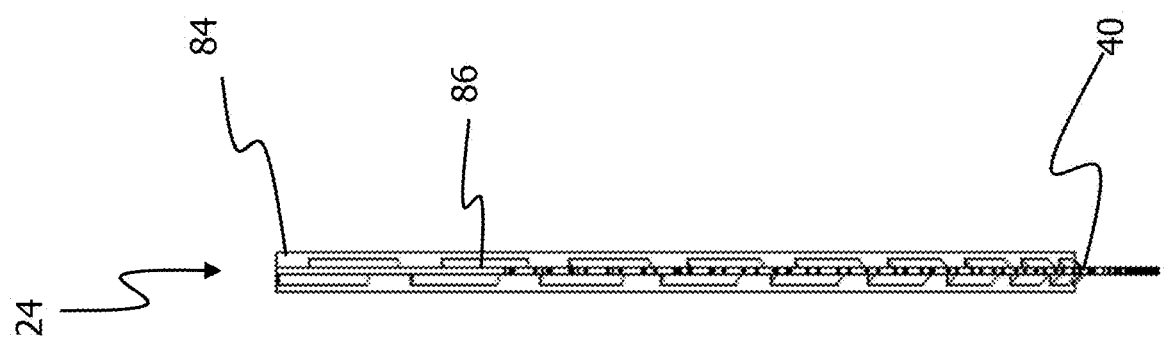

FIGS. 12 to 14 show different views of the drive arch 24. The drive arch 24 is composed of two partial arcs 80 and 82, which are connected to an arcuate base element 84. The partial arcs 80 and 82 can be welded to the base element 84, as can be seen from the weld seams 86 shown. Viewed in cross section, the drive arch 24 has an essentially T-shaped cross section through the base element 84. Starting from this base element 84, the partial arcs 80, 82 extend in the radial direction. The partial arcs 80, 82 each comprise two openings 88, via which the drive arch 24 can be connected to the cross member 22.

The drive contour 40 comprises drive recesses 42 and retaining recesses 44. The drive recesses 42 and the retaining recesses 44 are arranged alternately in the circumferential direction of the drive arch 24. The drive recesses 42 are radial incisions in the drive arch 24. The drive recesses 42 can also be referred to as slot-shaped. The sections of the drive arch 24 formed between the drive recesses 42 and/or the incisions are provided with retaining recesses 44. The retaining recesses 44 are curved and/or arched. The retaining recesses 44 are essentially semicircular. The drive recesses 42 extend further into the drive arch 24 in the radial direction than the retaining recesses 44.

Figure 15:
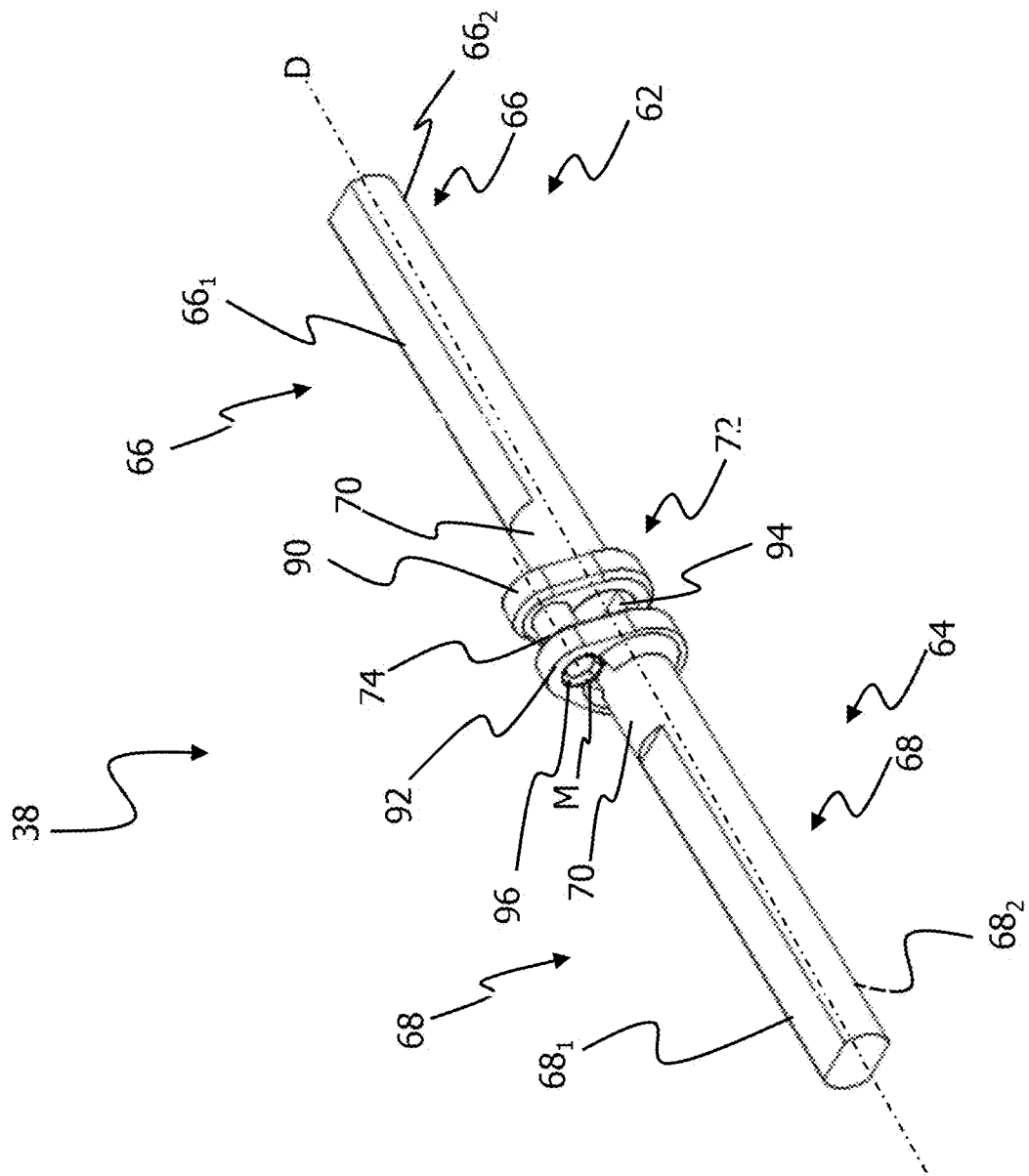
FIGS. 15 to 17 different views of a drive device of the pivoting unit shown in FIGS. 3 to 11.

FIG. 15 shows a perspective view of the drive device 38. The drive device 38 is rotatable about the axis of rotation D, which corresponds to the longitudinal axis of the drive device 38. The drive device 38 comprises a drive section 72 and two coupling elements 62 and 64. The coupling elements 62 and 64 each have a bearing section 70 and a coupling section 66 and 68. The coupling sections 66 and 68 have a cross section which is suitable for coupling to a drive shaft 14 (see FIG. 1). This cross section is formed by flattening $66_1$, $66_2$ and $68_1$, $68_2$ in the area of the coupling sections 66 and 68. The coupling sections 66 and 68 can be received, for example, in a drive shaft 14 with a recess which is complementary to the cross section of the coupling sections 66 and 68. Starting from the drive section 72, the coupling elements 62 and 64 extend in the opposite direction.

In addition to the drive element 74, the drive section 72 comprises two connecting elements 90 and 92 which connect the coupling elements 62 and 64 to the drive element 74. The connecting elements 90 and 92 can be formed in one piece with the coupling elements 62 and 64. The connecting elements 90 and 92 are cam-shaped. The drive section 72 also comprises a retaining element 94. The drive element 74 and the retaining element 94 extend between the two connecting elements 90 and 92. The retaining element 94 is formed in the shape of a semi-circle and arranged coaxially with the coupling elements 62 and 64. The drive element 74 is arranged eccentrically. The longitudinal axis M of the drive element 74 extends parallel but offset in the radial direction to the axis of rotation D of the drive device 38. The drive element 74 can be rod-shaped. The drive element 74 is received in openings 96 in the connecting elements 90 and 92.

Figure 16:
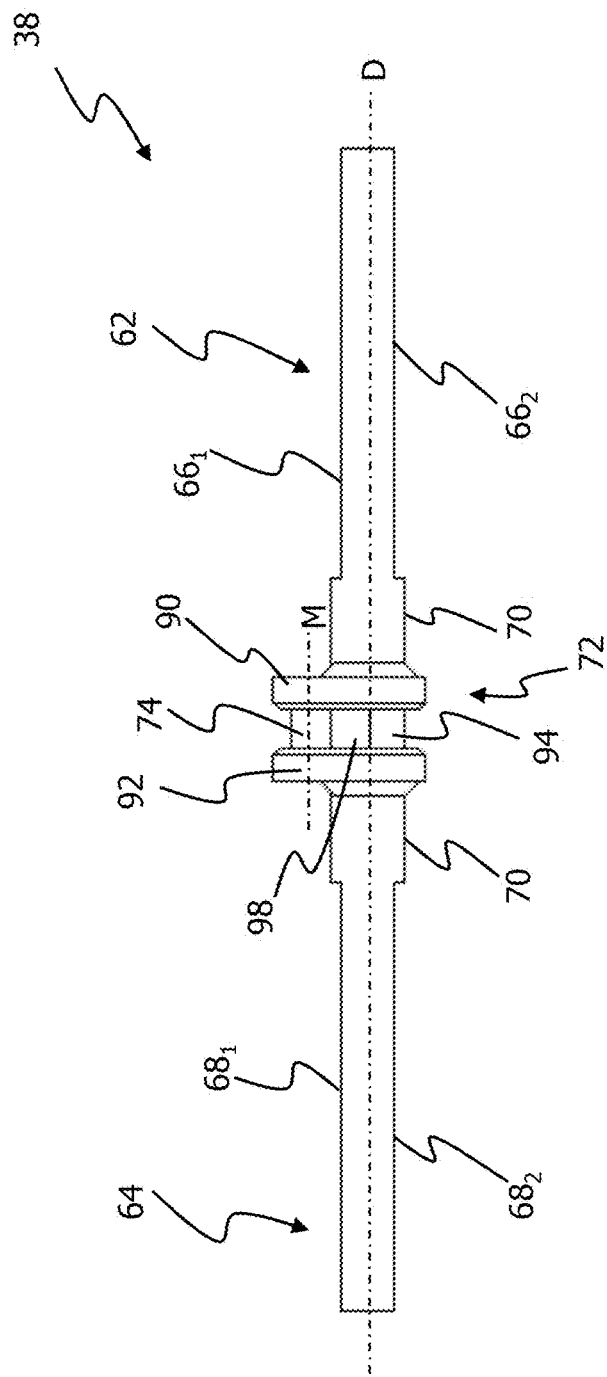

FIG. 16 shows a front view of the drive device 38. The bearing sections 70 of the coupling elements 62 and 64 have a circular cross section. At the transition between the bearing sections 70 and the coupling sections 66 and 68 with their flats $66_1$, $66_2$ and $68_1$, $68_2$, a step can be seen. The drive element 74 and the retaining element 94 extend between the two connecting elements 90 and 92. The drive element 74 is arranged eccentrically. The drive element 74 extends offset in the radial direction parallel to the axis of rotation D. A free space 98 can be seen between the drive element 74 and the retaining element 94. The retaining element 94 has a semi-circular outer contour, the outer surface of which in this embodiment extends on the same radius as the outer peripheral surfaces of the bearing sections 70 of the coupling elements 62 and 64 about the axis of rotation D of the drive device 38.

Figure 17:
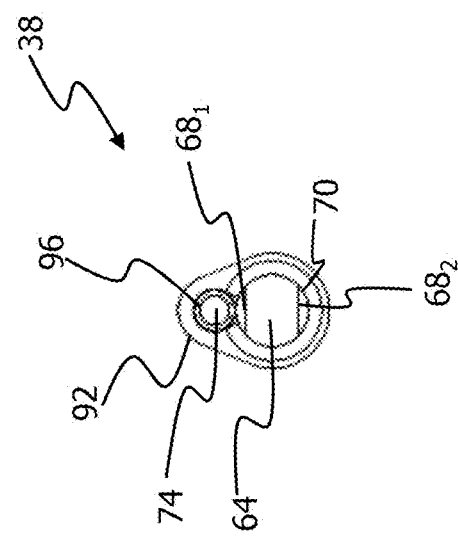

FIG. 17 shows a side view of the drive device 38, in which the coupling element 64, the connecting element 92 and the drive element 74 are shown. The connecting element 92 is cam-shaped. An opening 96 is formed in the connecting element 92, in which the drive element 74 is received.

FIGS. 18 to 33 described below show a pivoting unit 10 according to a second embodiment. The same reference numerals as in the first embodiment are used for features or components being similar or having an equivalent effect. To avoid repetitions, the differences between the two embodiments are described in detail below. Components and features that have already been described in detail with regard to the first embodiment are not described again in detail. The description of these components and features also applies analogously to the second embodiment.

FIGS. 18 to 22 show different views of a pivoting unit 10 according to the second embodiment. The pivoting unit 10 comprises a cross member 22, a drive arch 24 attached to the cross member 22 and a support member 26. The drive arch 24 is connected to the cross member 22 via fastening means 28. At the ends of the cross member 22 connecting elements 30 are attached, via which the cross member 22 can be connected to the support rails 16 and 18 (FIG. 1).

In contrast to the first embodiment, the support element 26 according to the second embodiment does not have a C-shaped cross section, but is rectangular in cross section. A pivot axis S extends through the pivot point SP formed at the connection point between the cross member 22 and the support element 26.

Furthermore, it can already be seen in FIGS. 18 to 22 that the drive device 38 according to the second embodiment differs from the drive device of the first embodiment. The drive device 38 and in particular the differences between the latter and the drive device according to the first embodiment will be discussed in detail in the further course of the description.

Figure 23:
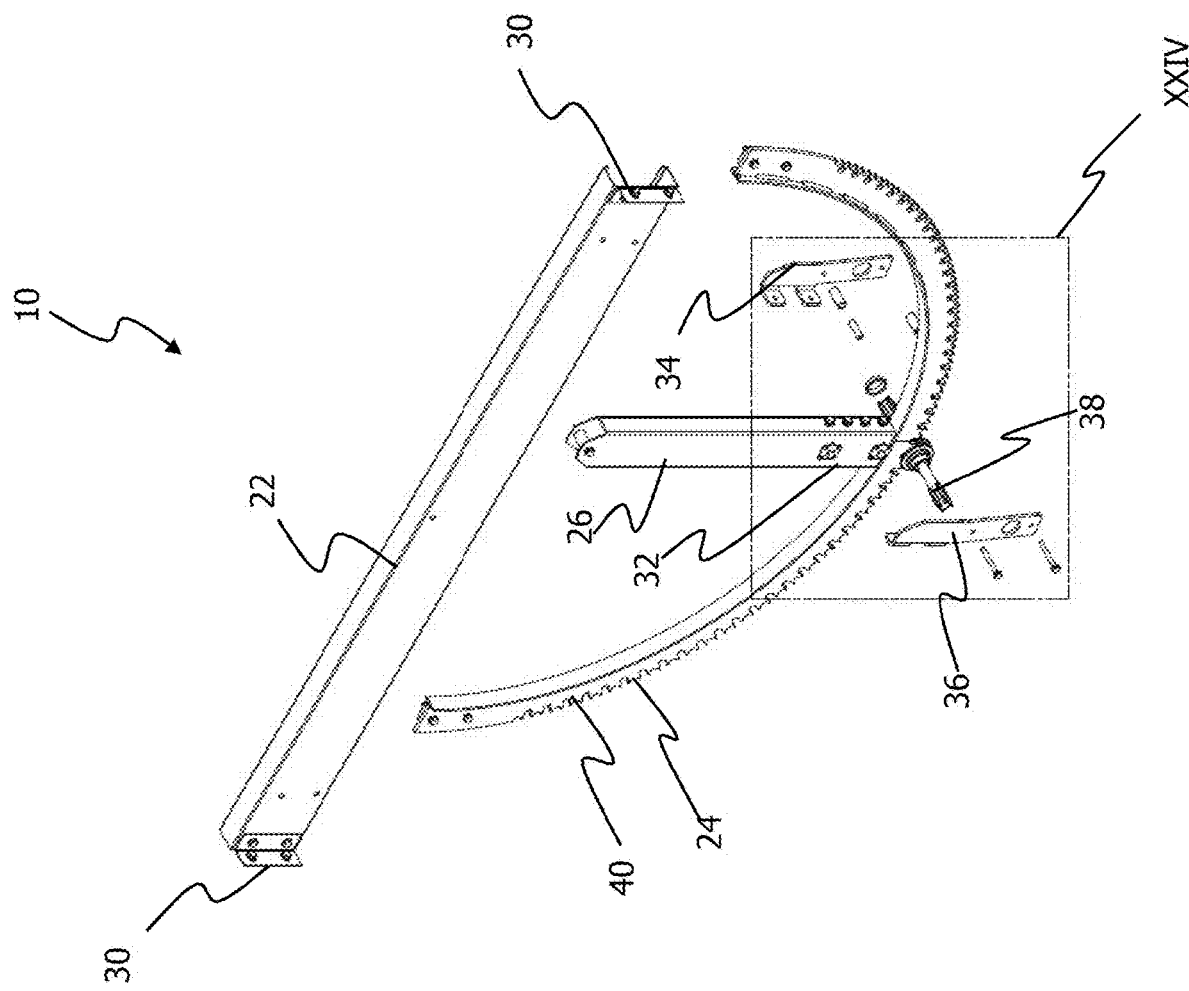
FIG. 23 an exploded view of the pivoting unit shown in FIGS. 18 to 22.

FIG. 23 shows an exploded perspective view of the pivoting unit 10. FIG. 23 shows the cross member 22, the drive arch 24, the support element 26, the drive device 38 and the two fastening elements 34 and 36.

Figure 24:
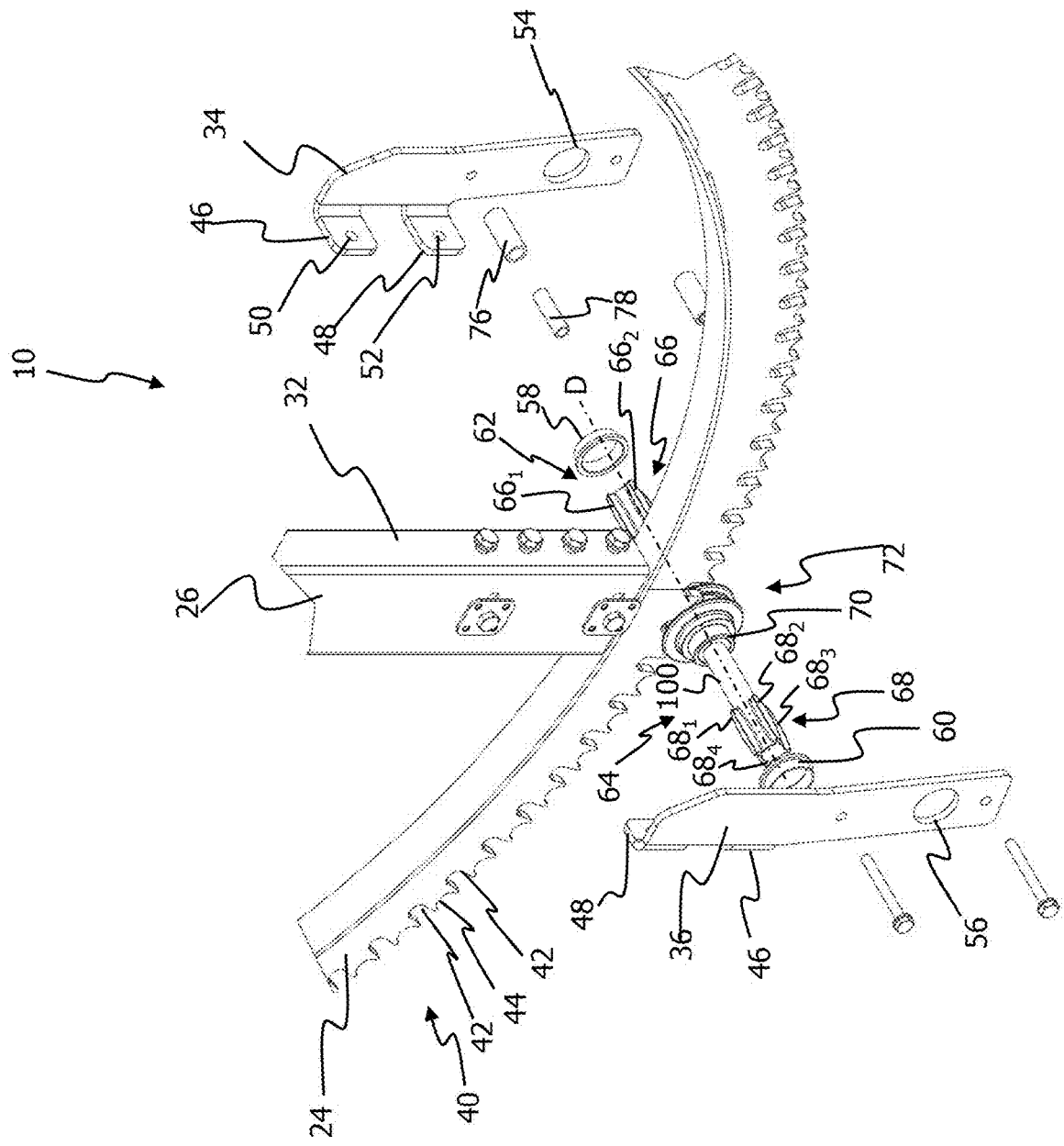
FIG. 24 an enlarged view of the detail marked in FIG. 23 with XXIV.

FIG. 24 shows an enlarged view of the detail identified by XXIV in FIG. 23. FIG. 24 shows the end 32 of the support element 26, the two fastening elements 34 and 36 and a section of the drive arch 24.

The drive device 38 comprises two coupling elements 62 and 64. The coupling elements 62 and 64 each comprise a coupling section 66, 68 and a bearing section 70, only the bearing section 70 being recognizable on the coupling element 64 in FIG. 24. The coupling sections 66 and 68 comprise projections $66_1$, $66_2$, $66_3$, $66_4$ and $68_1$, $68_2$, $68_3$, $68_4$ extending in the radial direction, via which the drive device 38 can be coupled with a correspondingly designed drive shaft 14 (see FIG. 1), wherein $66_3$ and $66_4$ are not visible in FIG. 24. The coupling sections 66 and 68 are each connected to the bearing sections 70 via a rod-shaped section 100. The drive section 72 of the drive device 38 is provided between the coupling elements 62 and 64, in which the drive element 74 and the retaining element 94 are formed.

The drive element 74 and the retaining element 94 alternately engage in the drive contour 40 of the drive arch 24.

Figure 25:
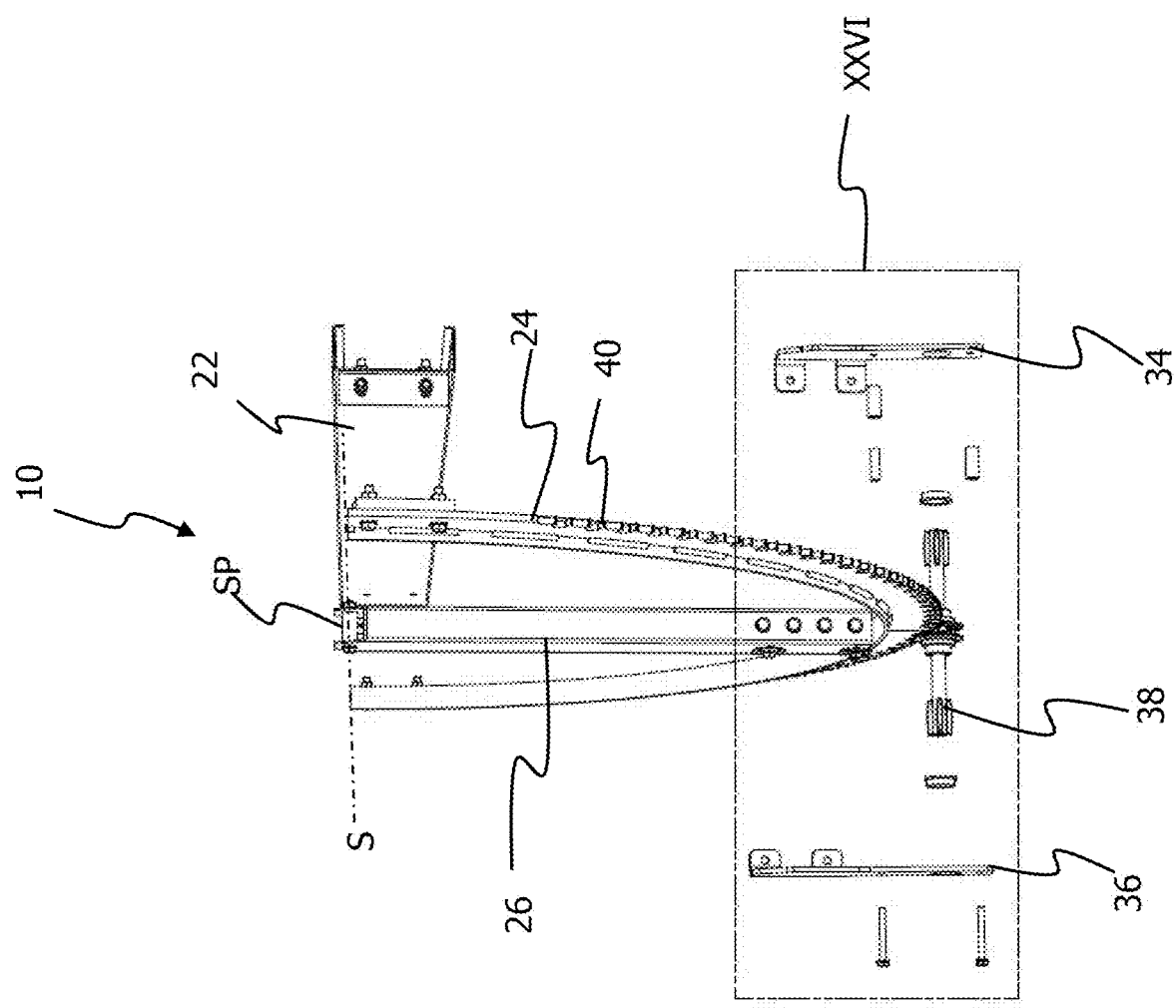
FIG. 25 a further exploded view of the pivoting unit shown in FIGS. 18 to 23.

FIG. 25 shows a further perspective exploded view of the pivoting unit 10. In FIG. 25, the cross member 22, the drive arch 24, the support member 26, the drive device 38 and the two fastening elements 34 and 36 are shown.

Figure 26:
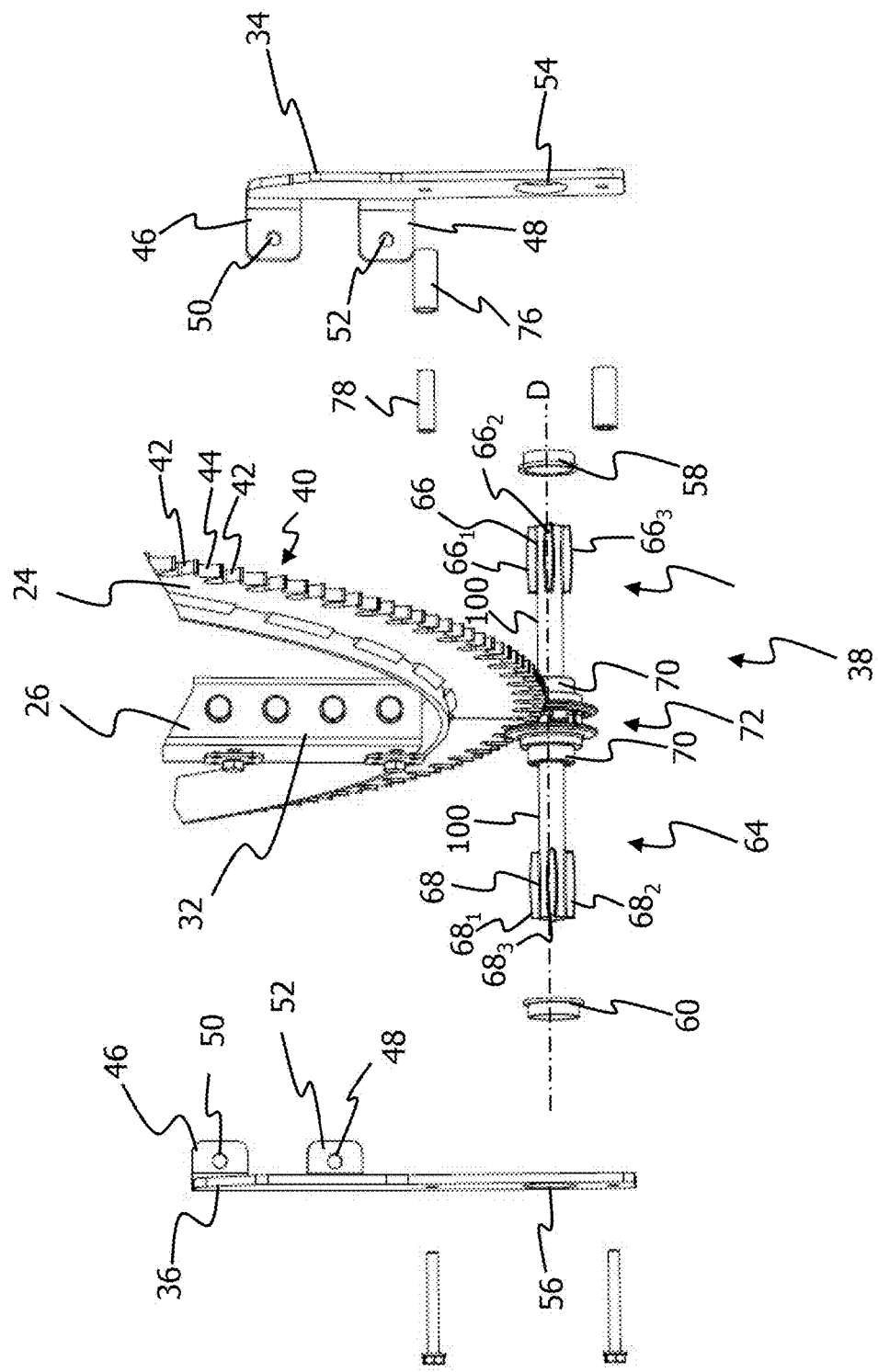
FIG. 26 an enlarged view of the detail marked in FIG. 25 with XXVI.

FIG. 26 shows an enlarged view of the detail marked XXVI in FIG. 25. FIG. 26 shows the drive device 38, which is in engagement with the drive contour 40 of the drive arch 24, the fastening elements 34 and 36 and the end 32 of the support element 26.

The drive device 38 comprises two coupling elements 62 and 64, which extend from the drive section 72 in the opposite direction. The bearing sections 70 of the coupling elements 62 and 64 adjoin the drive section 72 in the direction of the axis of rotation D. The bearing sections 70 are followed in the direction of the axis of rotation D by the connecting sections 100 which connect the bearing sections 70 to the coupling sections 66 and 68. The coupling sections 66 and 68 form the termination of the drive device 38 in the axial direction. In the assembled state of the pivoting unit 10, the coupling elements 62 and 64 extend through the openings 54 and 56 and through the bearing bushes 58 and 60 arranged in the openings 54 and 56.

Figure 27:
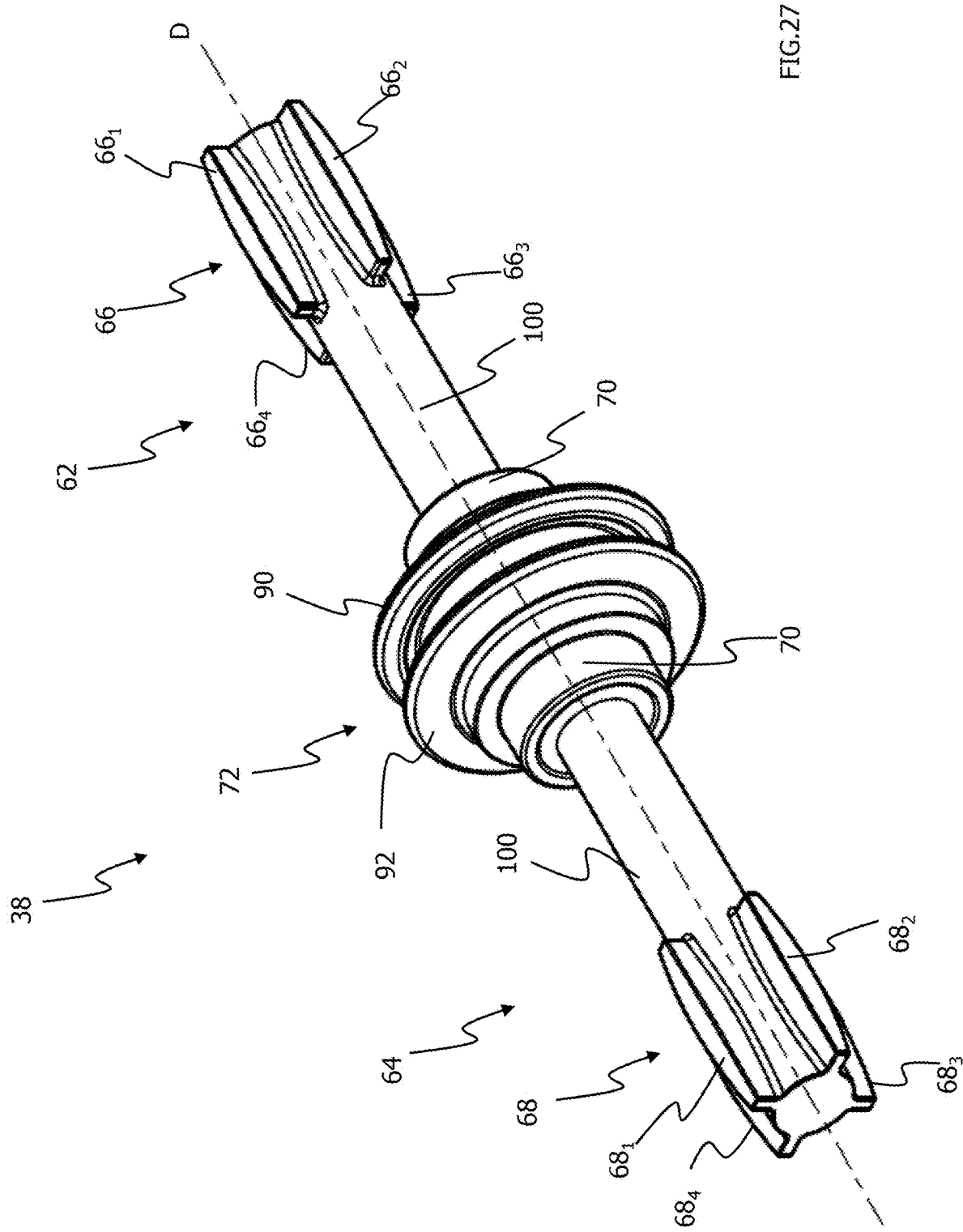
FIGS. 27 to 33 different views of a drive device of the pivoting unit shown in FIGS. 18 to 26.

FIG. 27 shows a perspective view of the drive device 38. The drive device 38 is rotatable about the axis of rotation D, which corresponds to the longitudinal axis of the drive device 38. The drive device 38 comprises a drive section 72 and two coupling elements 62 and 64. The coupling elements 62 and 64 each have a bearing section 70 and a coupling section 66 and 68. The coupling sections 66 and 68 are connected to the bearing sections 70 via the connecting sections 100. The coupling sections 66 and 68 comprise the projections $66_1$, $66_2$, $66_3$, $66_4$ and $68_1$, $68_2$, $68_3$, $68_4$ projecting in the radial direction. The coupling sections 66 and 68 with their projections $66_1$, $66_2$, $66_3$, $66_4$ and $68_1$, $68_2$, $68_3$, $68_4$ with a drive shaft 14 (see FIG. 1) are coupled to transmit torque. The coupling sections 66 and 68 and a section of the drive shaft 14 (see FIG. 1) can be designed to be complementary. The coupling sections 66 and 68 and the corresponding portion of a drive shaft 14 can be complementary so that they can be engaged with each other. The coupling sections 66 and 68 and/or the section of the drive shaft 14 can be designed in such a way that assembly-related distance tolerances between adjacent pivoting units 10 and/or posts 12 arranged next to one another are compensated to a limited extent. For example, the coupling elements 66 and 68 and the drive shaft can be designed in such a way that they are in engagement with one another in the direction of the pivot axis to allow a displacement relative to one another in order to be able to compensate for the tolerances mentioned.

The drive section 72 comprises two connecting elements 90 and 92. The connecting elements 90 and 92 can be formed in one piece with the coupling elements 62 and 64 and/or the drive element 74 and/or the retaining element 94. The connecting elements 90 and 92 are disk-shaped.

Figure 28:
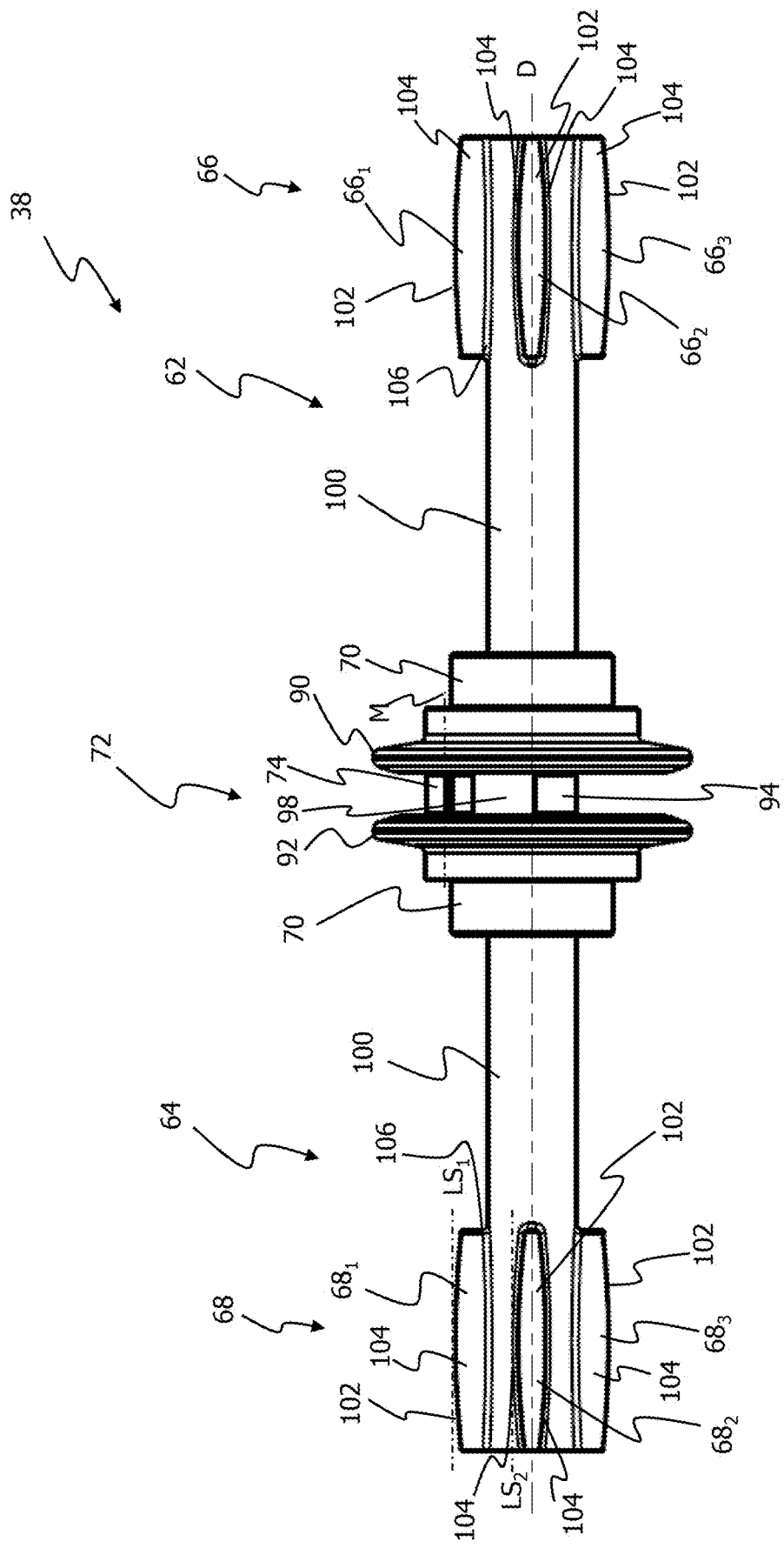

FIG. 28 shows a front view of the drive device 38. The drive element 74 and the retaining element 94 extend between the disk-shaped connecting elements 90 and 92. The connecting element 74 is arranged eccentrically. The retaining element 94 comprises a semicircular outer contour. The drive device 38 is rotatable about the axis of rotation D. The axis of rotation D extends through the center point of the semicircular outer contour of the retaining element 94. A free space 98 can be seen between the drive element 74 and the retaining element 94. The retaining element 94 is designed in cross section in the form of a circular sector with a semicircular outer contour (hereinafter referred to as "semicircular sector shape") and is arranged coaxially with the coupling elements 62 and 64. The drive element 74 is arranged eccentrically. The longitudinal axis M of the drive element 74 extends parallel but offset in the radial direction to the axis of rotation D of the drive device 38.

The coupling sections 66 and 68 comprise the projections $66_1$, $66_2$, $66_3$, $66_4$ and $68_1$, $68_2$, $68_3$ which projects in the radial direction, $68_4$, which can couple the drive device 38 to a drive shaft 14 (see FIG. 1) in a torque-transmitting manner. The projections $66_4$ and $68_4$ are not shown in FIG. 28 (see FIG. 27). The explanations below also apply analogously to the projections $66_4$ and $68_4$, which are not shown in FIG. 28. The projections $66_1$, $66_2$, $66_3$ and $68_1$, $68_2$, $68_3$ are spherical to compensate for angular misalignments between the drive device 38 and the drive shaft 14. For this purpose, the projections $66_1$, $66_2$, $66_3$ and $68_1$, $68_2$, $68_3$ comprise a curved radial outer surface 102. The outer surface 102 is curved in the direction of the axis of rotation D. The curvature is illustrated by the line LS1 shown in FIG. 28 which extends parallel to the axis of rotation D. Furthermore, the projections $66_1$, $66_2$, $66_3$ and $68_1$, $68_2$, $68_3$ comprise side surfaces $10_4$ which are curved and extend in the radial direction. The side surfaces $10_4$ extend in the radial direction between the outer surface 102 and the foot 106 of the respective projection $66_1$, $66_2$, $66_3$ and $68_1$, $68_2$, $68_3$. For reasons of clarity, the foot 106 of the projections $66_1$, $66_2$, $66_3$ and $68_1$, $68_2$, $68_3$ is only provided with a reference symbol in FIG. 28 for the projections $66_1$ and $68_1$. The side surface $10_4$ is curved in the direction of the axis of rotation D, as indicated by the line LS2 shown on one of the side surfaces $10_4$ in FIG. 28. The line LS2 extends parallel to the axis of rotation D. Due to the curvature of the radial outer surfaces 102 and the curved side surfaces $10_4$ of the projections $66_1$, $66_2$, $66_3$, $66_4$ and $68_1$, $68_2$, $68_3$, $68_4$, angular misalignments between the drive device 38 and the drive shaft 14 can be compensated for.

Figure 29:
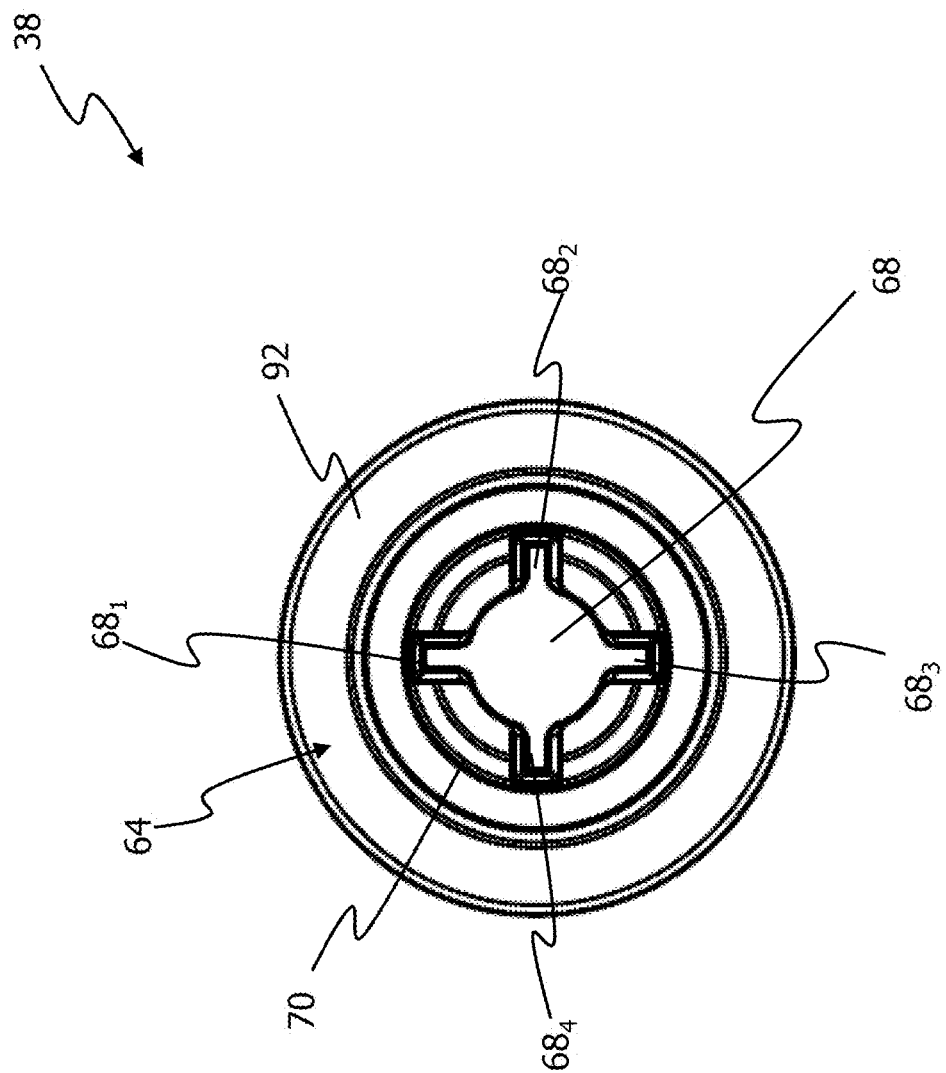

FIG. 29 shows a side view of the drive device 38, in which the coupling element 64, its coupling section 68 and the connecting element 92 are shown. The connecting element 92 is disk-shaped. The coupling section 68 comprises the projections $68_1$, $68_2$, $68_3$, $68_4$ projecting in the radial direction. The projections $68_1$, $68_2$, $68_3$, $68_4$ are offset by 90° to each other.

Figure 30:
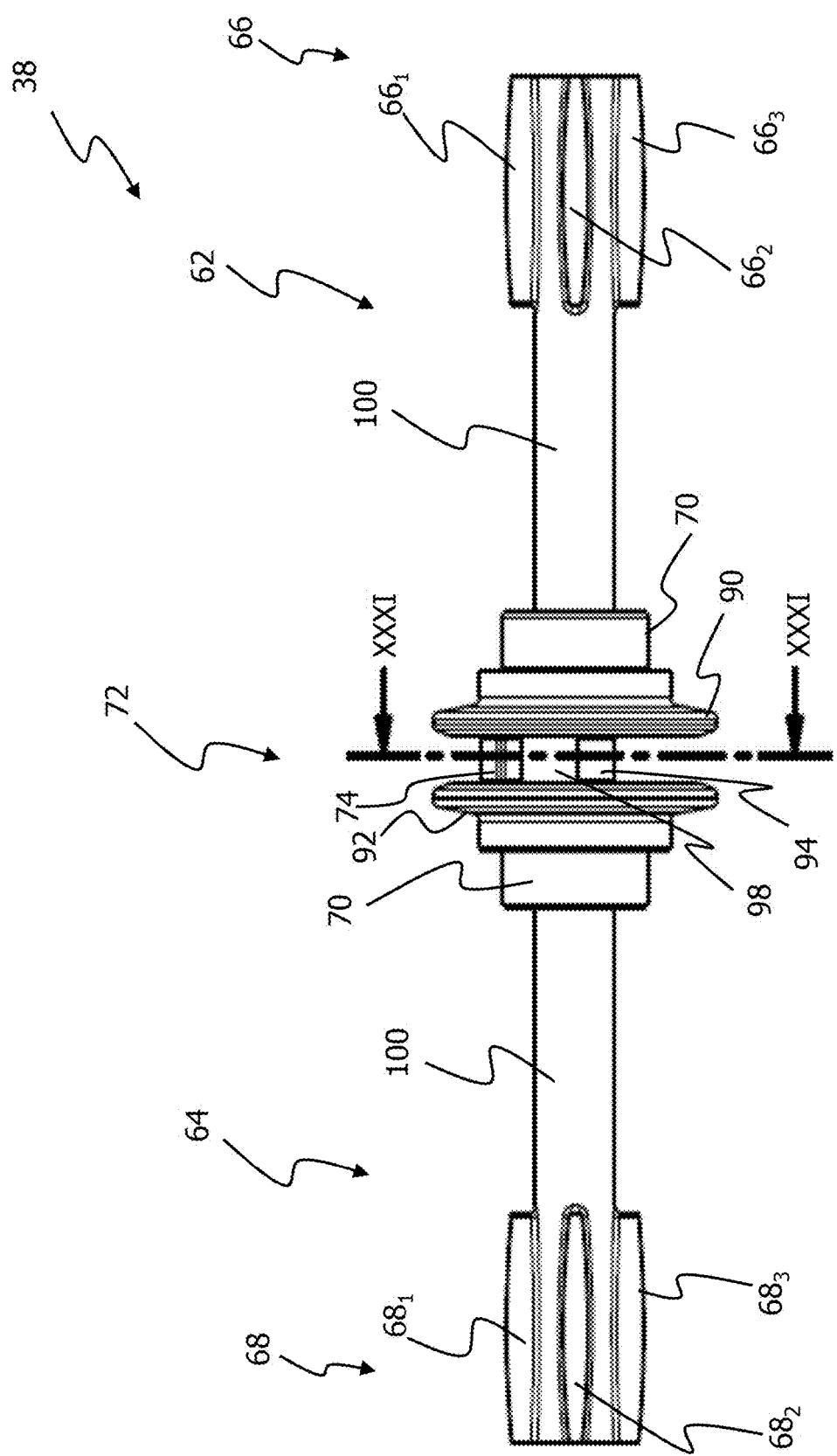
Figure 31:
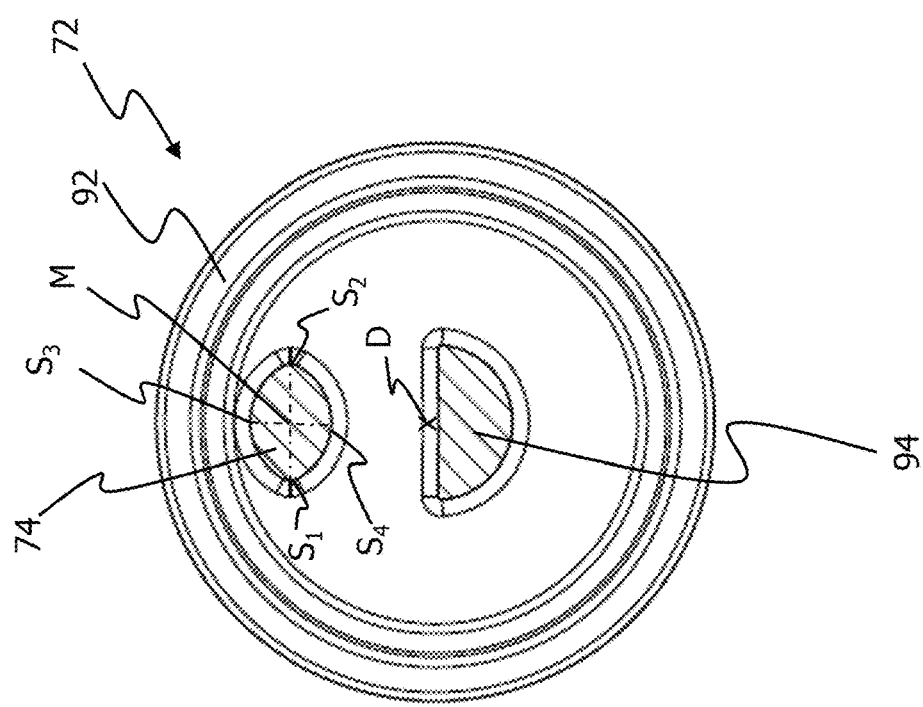

FIG. 30 corresponds to the front view of the drive device 38 according to FIG. 28, with the difference that the section line XXXI-XXXI is shown. FIG. 31 shows a sectional view along the section line XXXI-XXXI in FIG. 30. FIG. 31 shows the disk-shaped connecting element 92, the drive element 74 and the retaining element 94. The retaining element 94 is semicircular in cross-section.

Figure 32:
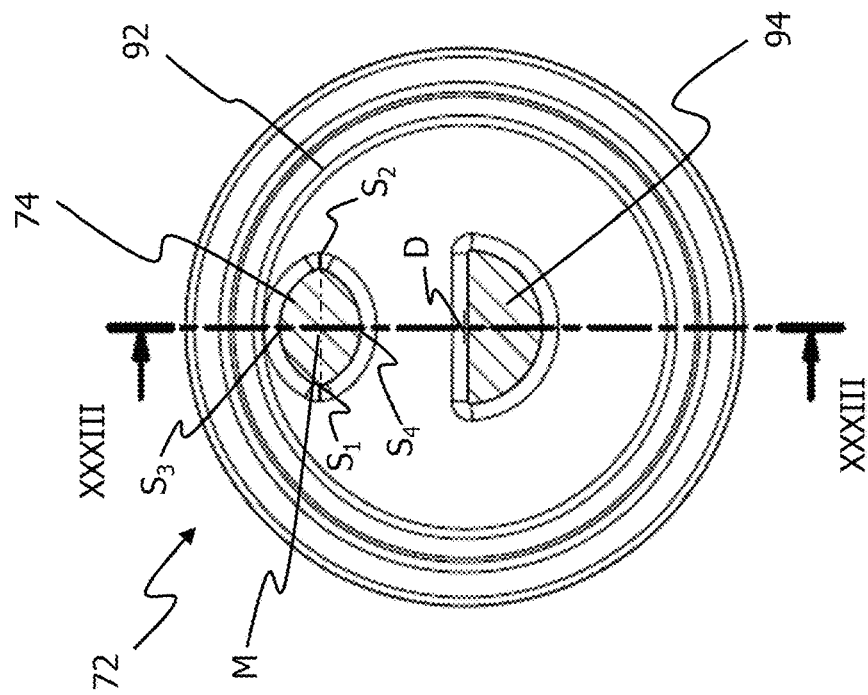

The drive element 74 comprises a cross section that deviates from a circular cross section and is arched at least in sections. The cross section of the drive element 74 is reduced in the radial direction with respect to the axis of rotation D compared to a circular cross section. The cross section of the drive element 74 can be described as oval or elliptical. As indicated in FIGS. 31 and 32, the cross section of the drive element 74 has four vertices $S_1$, $S_2$, $S_3$ and $S_4$. Between the vertices $S_1$ and $S_2$, the drive element 74 has its greatest extent in a direction transverse to the radial direction. In other words, the distance between the vertices $S_1$ and $S_2$ defines the greatest extent of the drive element 74. The vertices $S_3$ and $S_4$ are aligned in the radial direction. The distance between the vertices $S_3$ and $S_4$ is smaller than the distance between the vertices $S_1$ and $S_2$. The smaller distance between the vertices $S_3$ and $S_4$ lying in alignment in the radial direction makes it clear that the cross section of the drive element 74 is reduced in the radial direction.

Due to the reduced cross section of the drive element 74 in the radial direction, the engagement of the drive element 74 in one of the drive recesses 42 can be ensured, so that the function of the pivoting unit 10 can be ensured permanently. With the cross section of the drive element 74 being reduced in the radial direction, the drive element 74 can engage securely in the corresponding drive recess 42 even when the radial distance between the drive device 38 and the drive arch has increased. In particular, tolerance fluctuations within the pivoting unit 10 can be compensated for. Should the radial distance between the drive device 38 and the drive arch 24 increase due to tolerance fluctuations and/or elastic deformation, the oval cross section of the drive element 74 enables the drive element 74 to engage securely in the drive contour 40 of the drive arch 24 even in this case.

Furthermore, the distance between the opposite flanks of the drive recesses 42 (see for example FIGS. 24 and 26) can increase in the radial direction. The drive recesses 42 expand in the radial direction. This also ensures the safe "threading" and/or the secure engagement of the drive element 74 in one of the drive recesses 42 even with an increased radial distance between the drive device 38 and that of the drive arch 24.

FIG. 32 corresponds to FIG. 31, the section line XXXIII-XXXIII being shown in FIG. 32.

Figure 33:
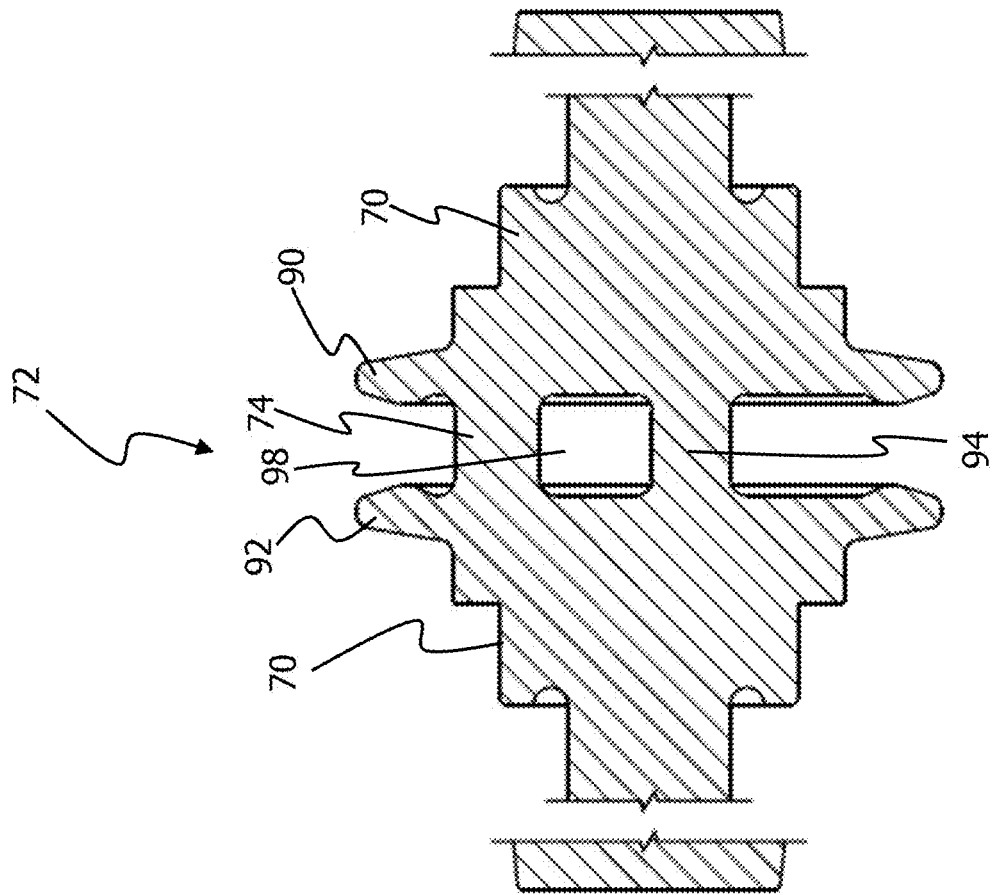

FIG. 33 shows a sectional view along the section line XXXIII-XXXIII in FIG. 32. The drive section 72 comprises two connecting elements 90 and 92. The connecting elements 90 and 92, the drive element 74 and the retaining element 94 can be formed in one piece. The drive element 74 and the retaining element 94 extend between the disk-shaped connecting elements 90 and 92. The drive element 74 is arranged offset in the radial direction to the retaining element 94, so that the free space 98 is formed.

FIGS. 34 to 42 described below show a pivoting unit 10 according to a third embodiment. The same reference numerals as in the first two embodiments are used for features or components being similar or having an equivalent effect. To avoid repetitions, the differences between the third embodiment and the previous embodiments are described in detail below. Components and features that have already been described in detail with respect to the first and/or the second embodiment are not described again in detail. The description of these components and features also applies analogously to the third embodiment.

Figure 34:
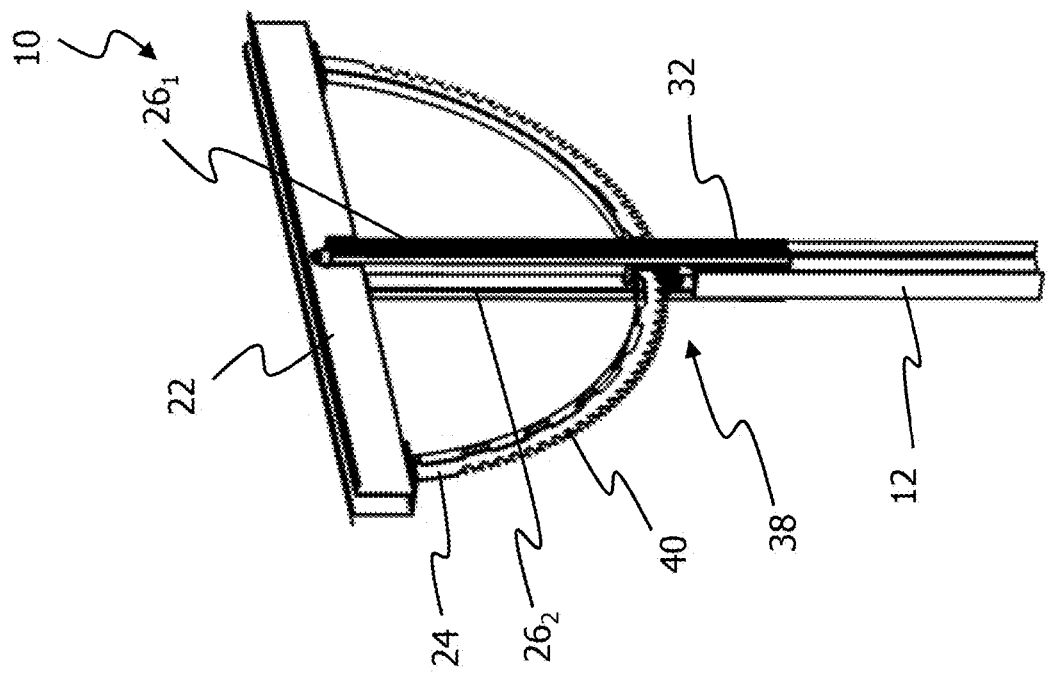
FIGS. 34 to 37 perspective views of a pivoting unit according to a third embodiment of the invention in the state of being attached to a post.

FIG. 34 shows a perspective view of a pivoting unit 10 according to a third embodiment in the state of being attached to a post 12. The pivoting unit 10 comprises a cross member 22, a drive arch 24 attached to it and two support members $26_1$ and $26_2$. The drive device 38 is only recognizable in outlines in FIG. 34. The pivoting unit 10 is connected to the post 12 via the support elements $26_1$ and $26_2$. The ends 32 of the support elements $26_1$ and $26_2$ form a connecting section via which the support elements $26_1$ and $26_2$ are connected to one another and to the post 12. The posts 12 according to this embodiment have an H-shaped cross section. The support elements $26_1$ and $26_2$ are supported on the post 12 by means of spacers which cannot be seen in FIG. 34.

Figure 35:
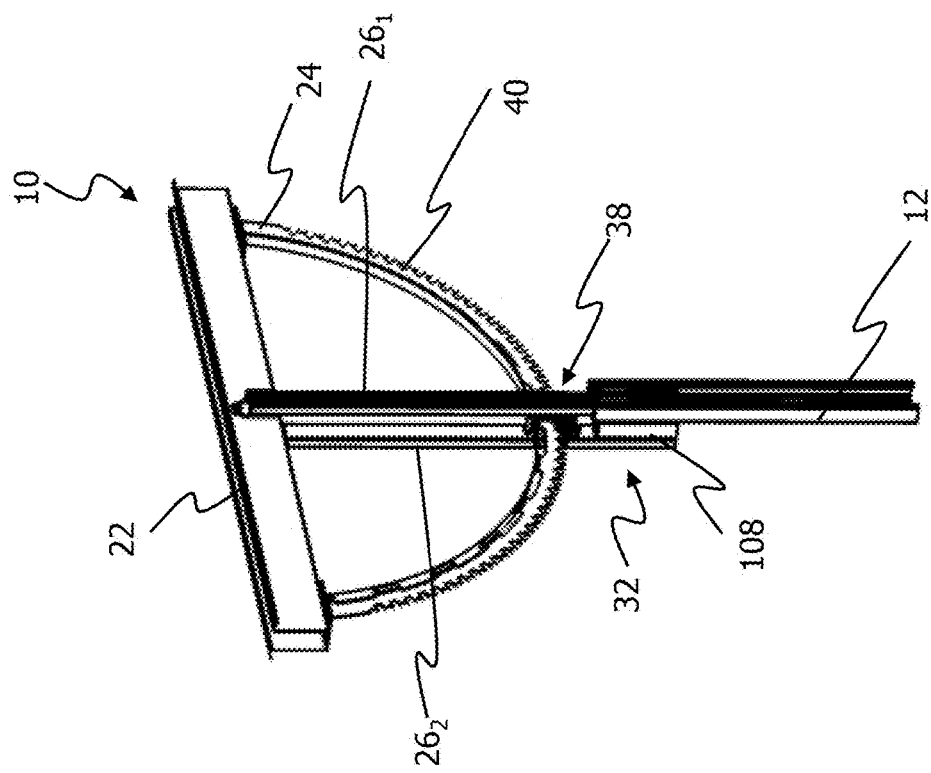

FIG. 35 shows a further perspective view of a pivoting unit 10 according to a third embodiment in the state of being attached to a post 12. The essential difference from the illustration according to FIG. 34 can be seen in the cross section of the post 12. According to FIG. 35, the post has a C-shaped cross section and does not have a H-shaped cross section like the post 12 according to FIG. 34. The support element $26_2$ is supported on the post 12 via a spacer 108. The support element $26_1$ abuts to the post 12. As mentioned, spacers are also provided in FIG. 34, which are arranged on both sides of the post 12 and are of the same size. These spacers are not shown in FIG. 34.

Figure 36:
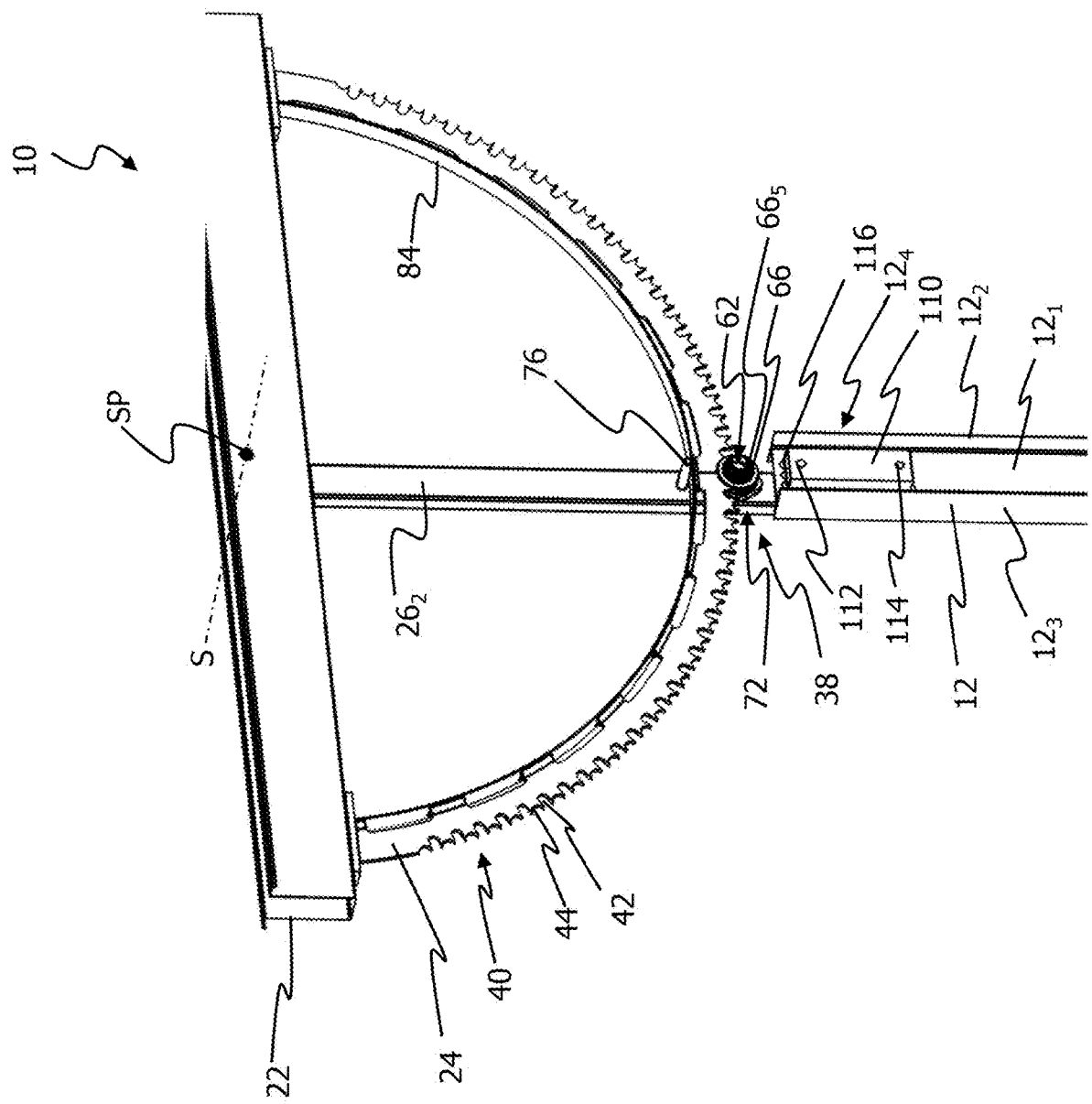

FIG. 36 shows an enlarged perspective view of the pivoting unit 10, the support element $26_1$ having been hidden. The H-shaped cross section of the post 12 can be clearly seen in FIG. 36. The H-shaped cross section of the post 12 is composed of a cross leg $12_1$ and two side legs $12_2$ and $12_3$, which are connected to one another via the cross leg $12_1$. A spacer 110 rests on the cross leg $12_1$ on both sides. The spacers 110, the support element $26_2$ and also the support element $26_1$, not shown in FIG. 36, are connected to the post 12 via connecting elements 112 and 114. For this purpose, the cross leg $12_1$ of the post 12 comprises a plurality of openings 116, which are recognizable in outlines in FIG. 36 above the spacer 110. The openings 116 are formed in an end section $12_4$ of the post 12, which is used for connection to the pivoting unit 10. The end section $12_4$ forms a connecting section for connecting the post 12 to the support elements $26_1$ and $26_2$.

The cross member 22 comprises a U-shaped or hat-shaped cross section. The drive arch 24 is fastened to the cross leg of the U-shape. The drive arch 24 comprises the drive contour 40. The drive contour 40 is composed of a plurality of drive recesses 42 and a plurality of retaining recesses 44 which are arranged alternately in the circumferential direction of the drive arch 24. The drive device 38 engages with the drive contour 40 of the drive arch 24 via its drive section 72.

The coupling section 66 of the coupling element 62 can be seen in FIG. 36. The coupling section 66 comprises a recess $66_5$, which has a hexagonal cross section. The same applies to the coupling section 68 of the coupling element 64, which, however, is not shown in FIG. 36 (see FIG. 42). The drive arch 24 can be supported on the guide element 76 in the radial direction via its base element 84. The guide element 76 is designed in the form of a radial stop with a circular cross section.

Figure 37:
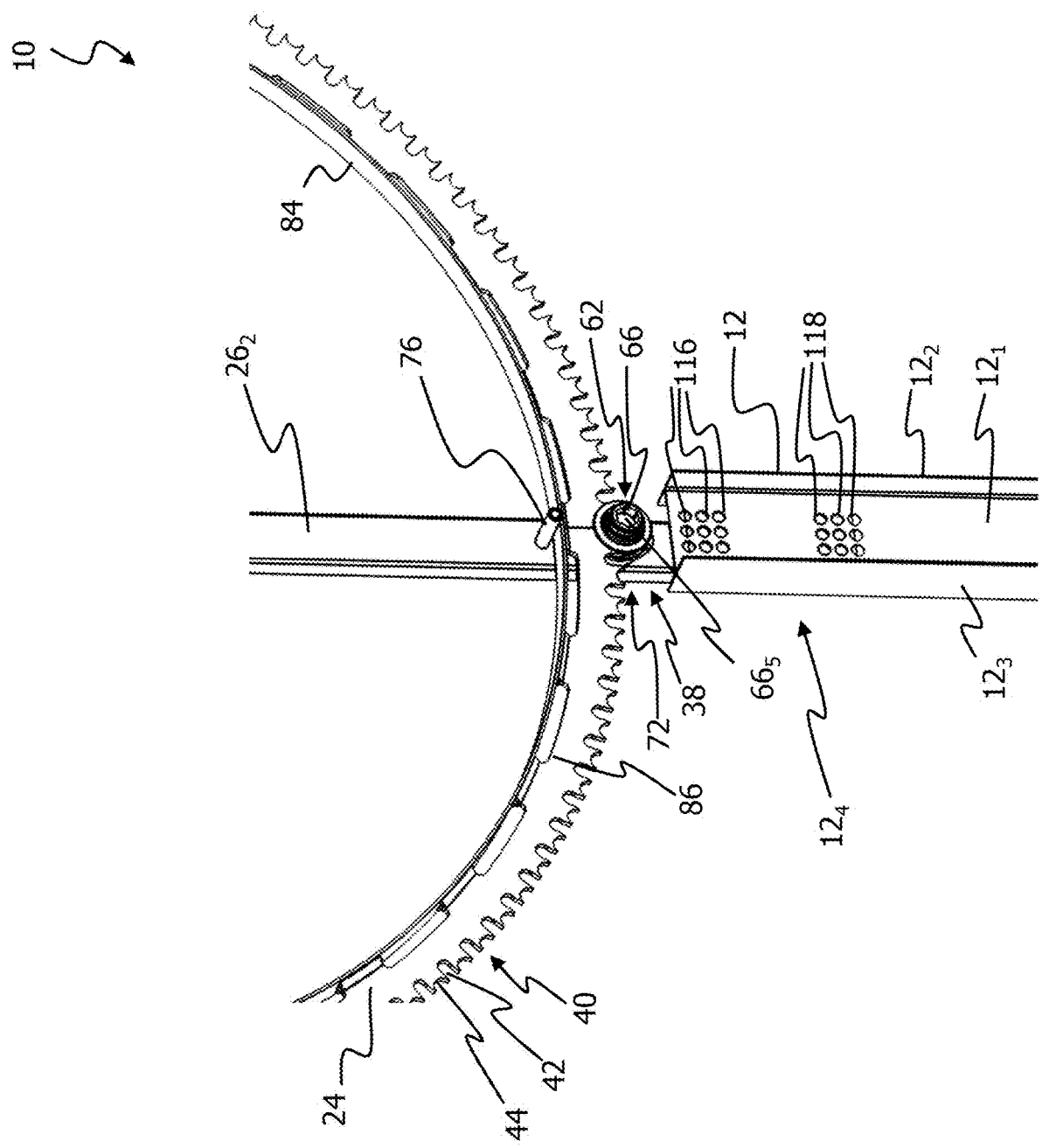

FIG. 37 shows an enlarged section of a side view, in which, in addition to the support element $26_1$, the spacer 110 has also been hidden. In FIG. 37, the openings 116 and 118 on the cross leg $12_1$ of the post 12 can be seen. The openings 116 and 118 are formed in an end section $12_4$ of the post 12, which is used for connection to the pivoting unit 10. The end section $12_4$ forms a connecting section for connection to the support elements $26_1$ and $26_2$. The end section $12_4$ of the post 12 is connected to the end 32 forming a connecting section (not shown in FIG. 37, see FIGS. 34 and 35) of the support elements $26_1$ and $26_2$. For reasons of clarity, only three openings 116 and/or 118 are designated. The openings 116 and 118 are offset from one another in the vertical direction. The connecting elements 112 and 114 shown in FIG. 36 can be inserted into one or more of the openings 116, 118 in order to create a connection between the support elements $26_1$ (not shown in FIG. 37) and $26_2$, the spacers 110 (not shown in FIG. 37) and the post 12. A number of openings 116, 118 are available for establishing the connection between the post 12 and the support elements $26_1$ (not shown) and $26_2$. By suitable selection of the openings 116, 118, which are to be used to establish a connection between the support elements $26_1$ (not shown in FIG. 37) and $26_2$ and the post 12, offsets in the horizontal direction and the vertical direction can be compensated for. Such offsets can occur, in particular, when a pivoting unit 10 is connected to a further pivoting unit (see FIG. 1) or a drive with assembly tolerances and unevenness in the terrain, or when adjacent posts or pivoting units are not in alignment.

FIG. 37 also shows the coupling section 66 of the coupling element 62. The coupling section 66 comprises a recess $66_5$, which has a hexagonal cross section. An adapter or directly a drive shaft (see FIG. 1) with a section or projection with a hexagonal cross section can be inserted into the recess $66_5$ of the coupling section 66 and drive the drive device 38. The same applies to the coupling section 68 of the coupling element 64 not shown in FIG. 37 (see FIG. 42).

Figure 38:
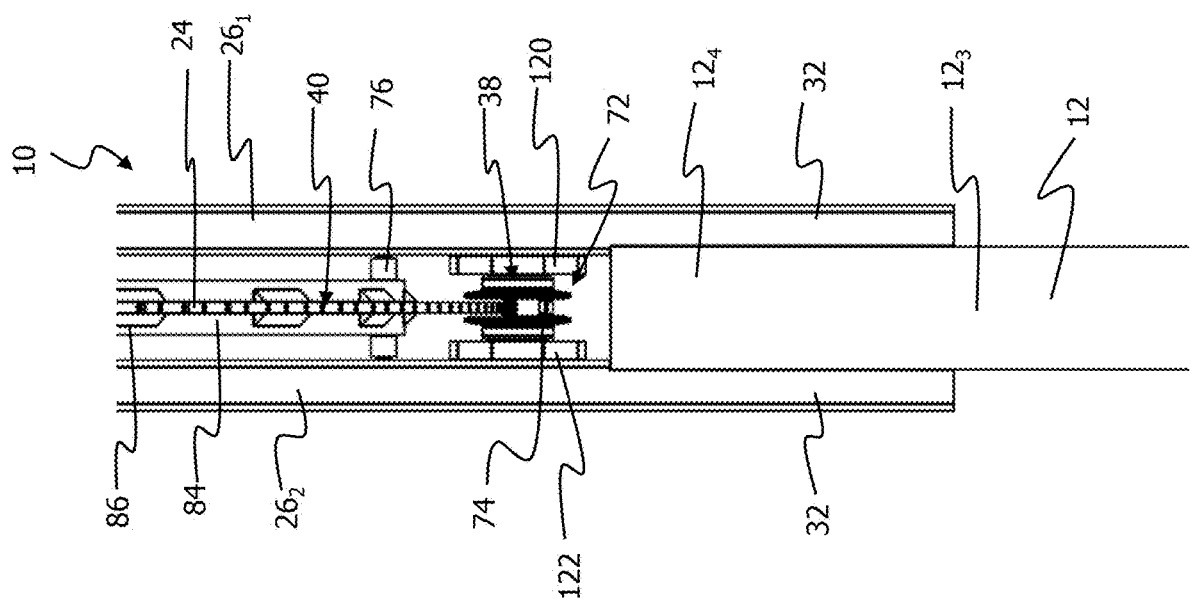
FIGS. 38 to 41 different side views of the pivoting unit according to the third embodiment of the invention in the state of being attached to a post.

FIG. 38 shows a section of a side view of the pivoting unit 10 in the state of being attached to a post 12. The post 12 has an H-shaped cross section. The drive device 38 extends between the two support elements $26_1$ and $26_2$. The support elements $26_1$ and $26_2$ each comprise a bearing point 120 and 122, on which the drive device 38 is mounted with its bearing sections not shown in FIG. 38. The bearing points 120 and 122 are designed in the form of bearing flanges which are connected to the support elements $26_1$ and $26_2$. The bearing flanges and/or the bearing points 120 and 122 receive the bearing sections (not shown) of the drive device 38 in sections. The bearings 120 and 122 can comprise plain bearings.

Figure 39:
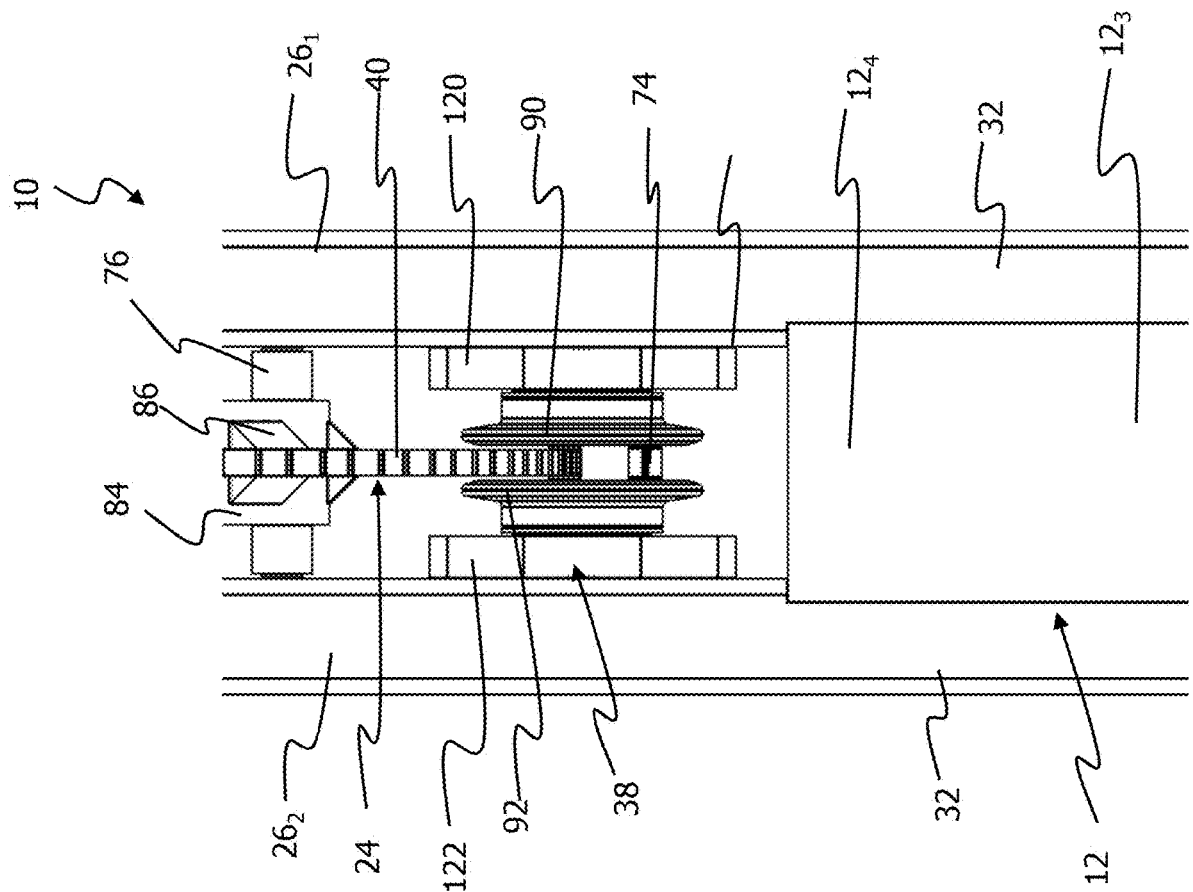

FIG. 39 shows an enlarged section of the view according to FIG. 38. The drive device 38 is mounted with its bearing sections, not shown in FIG. 39, in the bearing points 120, $12_2$ on the support elements $26_1$ and $26_2$. The drive arch 24 likewise runs between the two support elements $26_1$ and $26_2$. The drive arch 24 can be supported via its base section 84 on the guide element 76, which is designed in the form of a radial stop with a circular cross section. In particular, the drive contour 40 of the drive arch 24 runs between the two connecting elements 90 and 92 of the drive device 38. The drive element 74 and the retaining element 94, which cannot be seen in FIG. 39, also extend between the connecting elements 90 and 92. The retaining element 94, which cannot be seen in FIG. 39, is in the position of the drive device 38 shown in FIG. 39 in engagement with the drive contour 40 and in particular in engagement with a retaining recess 44

(see FIG. 37). In FIGS. 38 and 39, the post 12 is located essentially in the middle between the two support elements $26_1$ and $26_2$.

Figure 40:
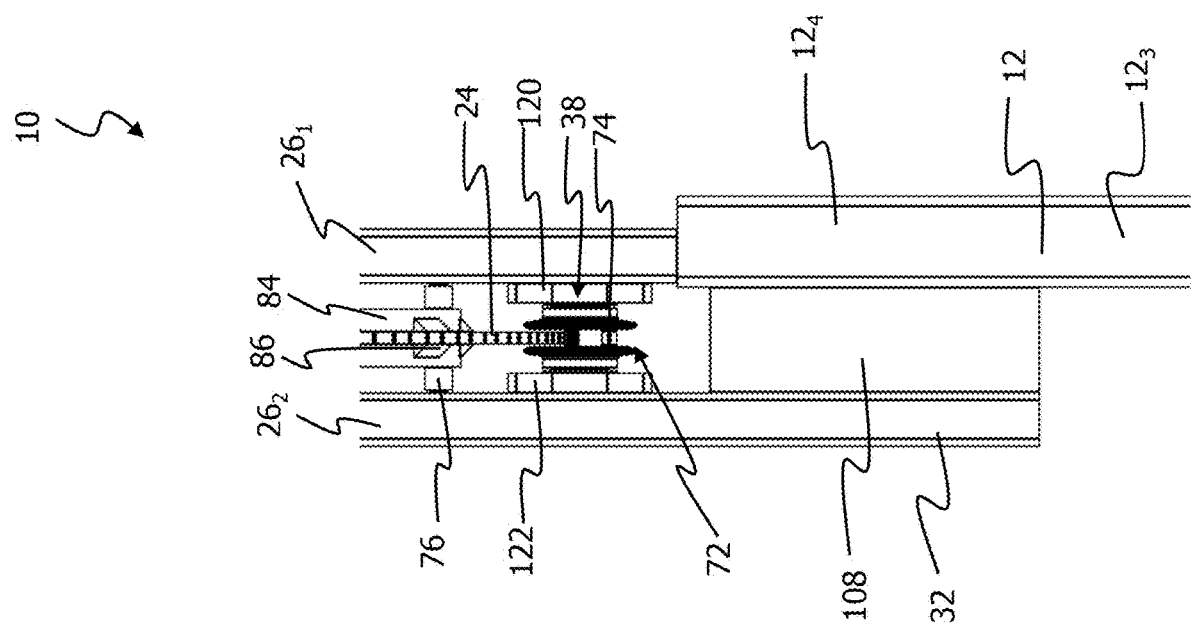

FIG. 40 shows a section of a side view of the pivoting unit 10 in the state of being attached to the post 12. In contrast to FIGS. 38 and 39, the post 12 here has a C-shaped cross section. The support element $26_2$ is supported on the post 12 via a spacer 108, the side leg $12_3$ of the C-shaped post 12 being recognizable in FIG. 40. The end 32 (not recognizable) of the support element $26_1$ is received in the C-profile of the post 12 and, like the support element $26_2$, is connected to the end section $12_4$ of the post 12.

Figure 41:
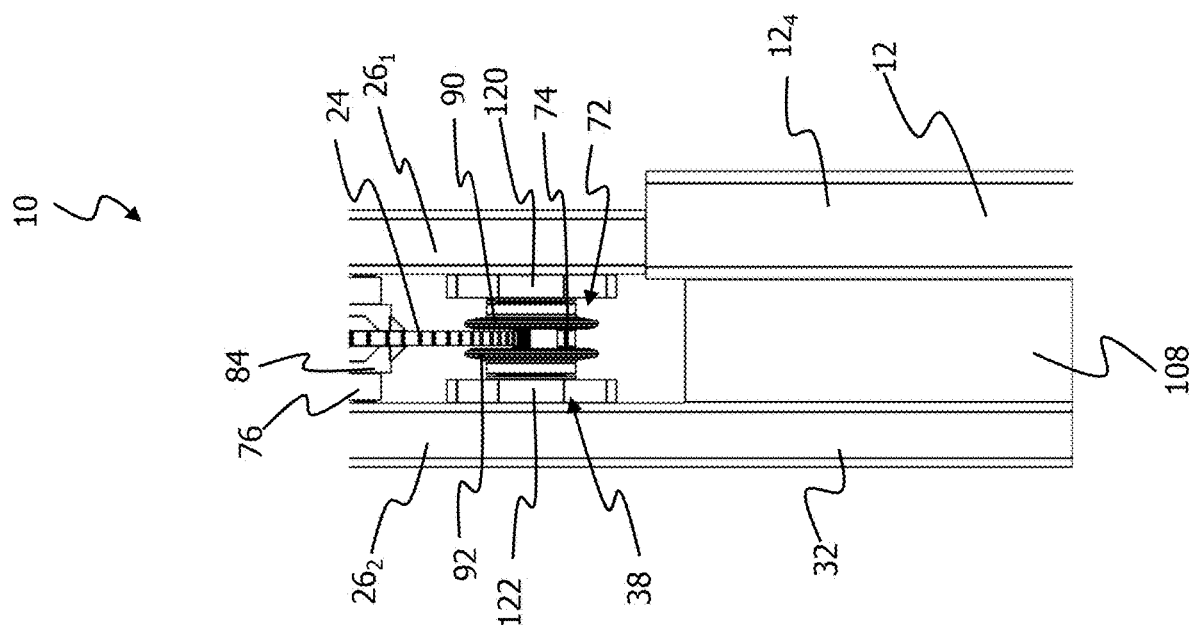

FIG. 41 shows an enlarged section of the view according to FIG. 40. The support element $26_2$ is supported on the post 12 via the spacer 108. The support element $26_1$, the spacer 108 and the support element $26_2$ are connected to one another and to the post 12 by means of connecting elements (not shown in FIG. 41).

Furthermore, FIG. 41 shows the bearing points 120 and 122 provided on the support elements $26_1$ and $26_2$, at which the drive device 38 is mounted. The drive unit 38 extends between the support elements $26_1$ and $26_2$ and is accommodated with its bearing sections (not shown) in the bearing projections 120, $12_2$.

Figure 42:
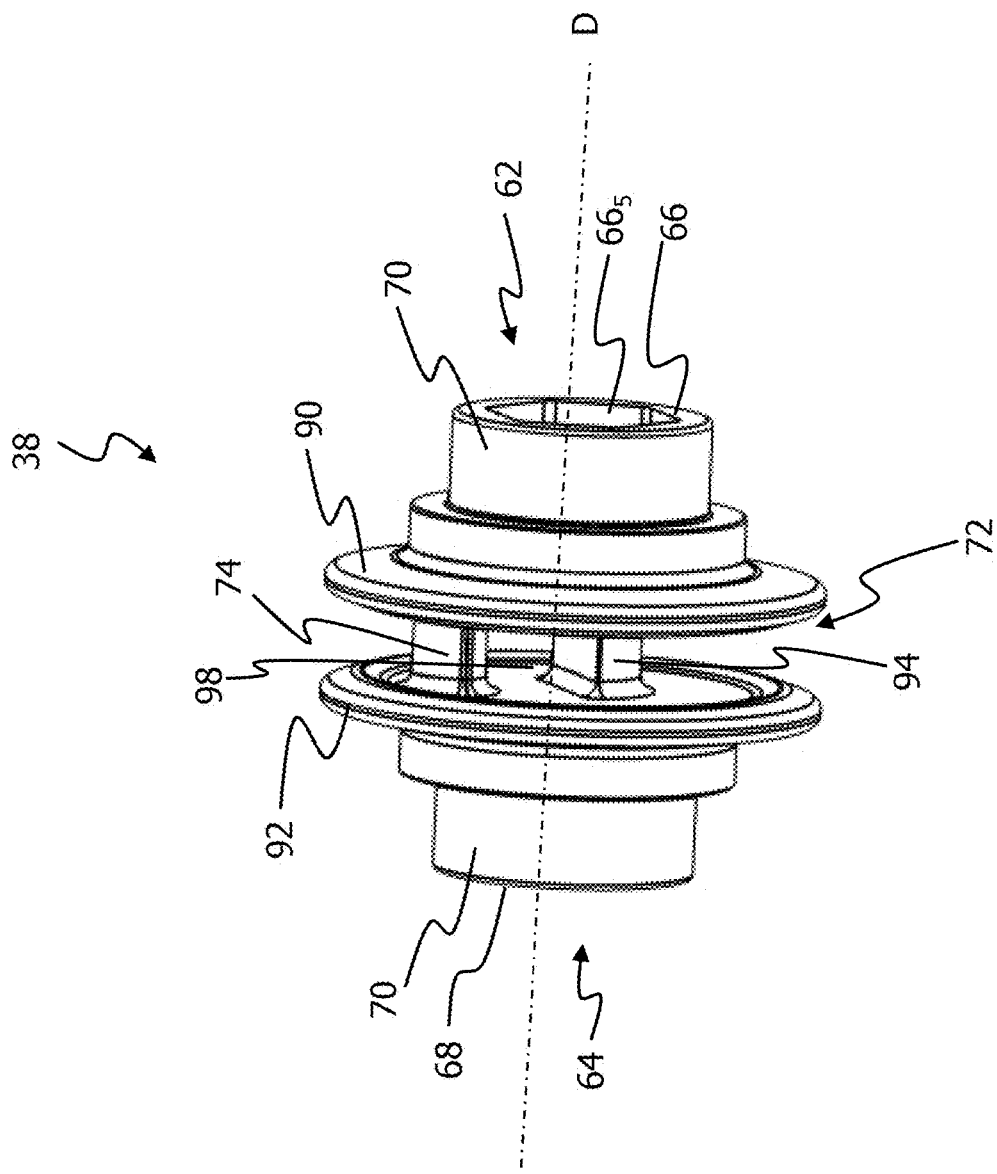
FIG. 42 a perspective view of the drive device according to the third embodiment of the invention.

FIG. 42 shows a perspective view of the drive device 38. The drive device 38 comprises coupling elements 62 and 64, between which a drive section 72 is arranged. The connecting elements 90 and 92 connect the coupling elements 62 and 64 to the drive element 74 and the retaining element 94. The drive element 74 and the retaining element 94 extend between the connecting elements 90 and 92 and are spaced apart from one another by the free space 98.

The coupling elements 62 and 64 each comprise a bearing section 70 with which the drive device 38 can be received in the bearing points 120 and 122 (see FIGS. 38 to 41). The coupling section 66 can be seen on the coupling element 62 radially inward of the bearing sections 70. The coupling section 66 comprises a recess $66_5$. The recess $66_5$ has a hexagonal cross section. A hexagonal projection of a drive shaft 14, an adapter or a drive can be inserted into the coupling section 66 in order to couple the drive device 38 to a drive in a torque-transmitting manner (see FIGS. 1 and 2). The coupling element 64 also comprises such a coupling section 68 with a recess, which, however, is not shown in FIG. 42.

The function of the pivoting unit 10 is explained below. The pivoting unit 10 can be driven via a drive shaft 14 shown in FIG. 1 or a drive. For this purpose, the drive shaft 14 can be coupled to the drive device 38 via one of the coupling elements 62 or 64 in a torque-transmitting manner. The drive device 38 is mounted rotatably about the axis of rotation D (see FIGS. 9, 11, 15, 16, 24, 26 to 28, 31, 32 and 42) in the fastening elements 34 and 36 and/or in the bearing points 120 and 122. The axis of rotation D of the drive device 38 extends essentially parallel to the pivot axis S. A drive shaft 14 connected to the drive device 38 can also extend essentially parallel to the pivot axis S.

The drive torque transmitted to the drive device 38 via one of the coupling elements 62 and 64 sets the drive device 38 in rotation. The drive element 74 thereby rotates on a circular path with a predetermined radial distance about the axis of rotation D. The drive device 38 is coupled via its drive element 74 to the drive arch 24 in a torque-transmitting manner, so that the drive arch 24 may be gradually pivoted about the pivot axis S by a rotary movement of the drive device 38 about the axis of rotation D. The drive element 74 can engage in one of the drive recesses 42 through the rotary movement carried out by the drive device 38, take the drive arch 24 with it and leave the corresponding drive recess 42. In this way, an adjustment step about the pivot axis S is carried out and the drive arch 24 with the cross member 22 attached to it is transferred into a new pivot position. Between the engagement in the drive recess 42 and the leaving of the drive recess 42, the drive element 74 presses against a flank of the drive recess 42. As a result, a torque is transmitted to the drive arch 24 so that the adjustment step of the drive arch 24 and the cross member 22 about the pivot axis S is carried out.

Due to the movement of the drive element 74 and the drive arch 24, the retaining element 94 of the drive device 38 engages with a retaining recess 44. The retaining element 94 engages in a retaining recess 44 adjacent to the drive recess 42, which has just left the drive element 74. The retaining element 94 can rotate in the corresponding retaining recess 44.

The retaining element 94 engages with a first section of its cross section in the retaining recess 44, this section increasing continuously due to the rotary movement of the drive device 38 with the retaining element 94. The engagement of the retaining element 94 in the retaining recess 44 prevents rotation and/or pivoting of the cross member 22 and the drive arch 24 attached to it about the pivot axis S. The drive device 38 and the drive arch 24 are thus in a locked position. If the drive device 38 is driven further in this state, the retaining element 94 leaves the retaining recess 44 again and releases the drive arch 24 for an adjustment step initiated by the drive element 74.

The retaining element 94, when it is in engagement with a retaining recess 44, can prevent a relative rotation between the drive arch 24 and the cross member 22 connected thereto and the respective support element 26, $26_1$, $26_2$ in the state of being attached to at least one post 12. As soon as the retaining element 94 also engages with a (partial) section in a retaining recess 44, rotation of the drive arch 24 about the pivot axis S is prevented, i.e., a complete inclusion of the cross section of the retaining element 94 in a retaining recess 44 is not required in order to prevent rotation of the drive arch 24. Due to the alternating arrangement of the drive recesses 42 and the retaining recess 44, an adjustment step of the drive arch 24 initiated by the drive element 74 or a holding step can alternately be carried out in which the drive arch 24 can be held in a blocking position via the retaining element 94. The retaining element 94 can prevent an undesired adjustment of the pivoting unit 10 about the pivot axis S without a torsional moment being transmitted to the drive shaft 14 and/or the drive.

However, if the drive arch 24 and the cross member 22 connected to it are to be pivoted further, the drive device 38 is driven further until the drive element 74 engages in the next drive recess 42 and a further adjustment step is carried out. If the drive arch 24 and the cross member 22 connected to it are to be locked in the set position, the drive device 38 is stopped in the locked position. In this position, the retaining element 94 is at least partially engaged with a retaining recess 44.

The connecting elements 90 and 92 form a guide for the drive arch 24 in the direction of the axis of rotation D and/or the pivot axis S, which extend parallel to one another. For this purpose, the connecting elements 90 and 92 enclose the drive arch 24 between them. Because of the connecting elements 90 and 92, the drive arch 24 cannot bypass the drive element 74 and also not the retaining element 94 in the axial direction. The drive arch 24 is thus held in engagement with the drive element 74 and the retaining element 94 by the connecting elements 90 and 92. The structure of the pivoting unit 10 can be considerably simplified by the guide function provided by the connecting elements 90 and 92.

The pivoting unit 10 can also considerably simplify the assembly of a tracking apparatus NV. The pivoting unit 10 can be preassembled. The preassembled pivoting unit 10 can then be connected as an independent unit to posts 12 already anchored in the floor. The posts 12 are connected to the end 32 of the respective support element 26, $26_1$, $26_2$. This completes the assembly of the pivoting unit 10 on the post 12. If several pivoting units 10 (see FIG. 1) are to be provided, these pivoting units 10 are brought into alignment with one another in accordance with the pivot axis S and connected to one another via the drive shafts 14 and the frame elements and/or support rails 16 and 18. Each coupling element 62 and 64 of the drive device 38 can be connected via a drive shaft 14 to a further pivoting unit 10 or a drive and/or motor. The ends of the drive shafts 14 and/or corresponding adapters and/or the coupling elements of the drive device 38 are configured such that both misalignments between the drive device 38 and the drive shaft 14 and distance tolerances between the drive device 38 in the direction of the pivot axis S can be compensated for.

The invention claimed is:

1. A pivoting unit for a tracking apparatus for solar modules, comprising:
   at least one cross member pivotable about a pivot axis;
   at least one drive arch connected to the at least one cross member, which comprises a plurality of drive recesses and a plurality of retaining recesses; and
   at least one rotatably mounted drive device, the at least one drive device being designed such that the at least one drive device engages in at least one of the drive recesses of the drive arch for pivoting the at least one cross member, and wherein the at least one drive device is designed such that the at least one drive device engages in at least one of the retaining recesses in order to hold the cross member in a pivot position, wherein the at least one drive device is designed such that the at least one drive device alternately engages in at least one of the drive recesses and in at least one of the retaining recesses, wherein the drive device comprises at least one eccentrically arranged drive element which engages in at least one of the drive recesses of the drive arch for pivoting the at least one cross member, wherein the at least one drive device comprises at least one retaining element which engages in at least one of the retaining recesses of the drive arch in order to hold the at least one cross member, wherein the at least one drive device comprises at least one coupling section for coupling the drive device to at least one selected from the group comprising a drive of a tracking system and to a further pivoting unit, and wherein the at least one coupling section is designed to compensate for at least one selected from the group comprising an angular misalignments and tolerances in the direction of the pivot axis.

2. The pivoting unit according to claim 1, wherein the pivoting unit comprises at least one support element for connecting the pivoting unit to at least one post which is anchored or can be anchored in or on the ground, the at least one cross member being pivotally connected about the pivot axis to the at least one support element.

3. The pivoting unit according to claim 2, wherein the pivoting unit comprises at least one fastening element for attaching the at least one drive device to the at least one support element or the at least one post, the at least one drive device being rotatably mounted on the at least one fastening element.

4. The pivoting unit according to claim 2, wherein the at least one drive device extends at least in sections through the at least one support element.

5. The pivoting unit according to claim 2, wherein the at least one drive device is arranged within at least one support element, or wherein the at least one drive device is arranged between at least two support elements.

6. The pivoting unit according to claim 1, wherein the at least one drive device is designed such that it forms at least one selected from the group comprising an axial and radial guide for the at least one drive arch.

7. The pivoting unit according to claim 1, wherein the pivoting unit comprises at least one guide device which guides the drive arch in the radial direction.

8. The pivoting unit according to claim 1, wherein at least one selected from the group comprising the at least one drive element and the at least one retaining element extend essentially parallel to the axis of rotation of the drive device.

9. The pivoting unit according to claim 1, wherein the at least one drive device comprises at least one connecting element which connects at least one coupling element to the at least one drive element and the at least one retaining element.

10. The pivoting unit according to claim 9, wherein the at least one drive device comprises two connecting elements which are designed for axially guiding the drive arch.

11. The pivoting unit according to claim 10, wherein at least one selected from the group comprising the at least one drive element and the at least one retaining element extend between the two connecting elements.

12. The pivoting unit according to claim 1, wherein the at least one drive element is oval, lenticular, elliptical or circular in cross-section.

13. The pivoting unit according to claim 1, wherein the at least one drive shaft or a corresponding adapter is designed to compensate for at least one selected from the group comprising angular misalignments and tolerances in the direction of the pivot axis.

14. A tracking apparatus for solar modules comprising at least one pivoting unit according to claim 1, which is arranged on at least one post which is anchored or can be anchored in or on the ground.

15. The tracking apparatus according to claim 14, wherein the at least one pivoting unit is at least one selected from the group comprising coupled to at least one further pivoting unit and a drive via at least one drive shaft.

16. The tracking apparatus according to claim 15, wherein the pivoting unit is coupled to the at least one drive shaft via the at least one coupling section of the at least one drive device.

17. The tracking apparatus according to claim 14, wherein the at least one drive device is coupled to the at least one drive shaft via at least one adapter.

18. The tracking apparatus according to claim 14, wherein at least one selected from the group comprising the at least one support element and the at least one post have at least one connecting section via which the at least one support element and the at least one post are connected to one another.

19. The tracking apparatus according to claim 18, wherein at least one selected from the group comprising the at least one connecting section of the at least one support element and the at least one post is formed to compensate for at least one selected from the group comprising a misalignment in the direction of the pivot axis and to compensate for a misalignment transverse to the pivot axis.

20. An assembly method for a tracking apparatus, comprising the steps of:
assembling a pivoting unit according to claim 1; and
connecting the assembled pivoting unit to posts which are anchored or can be anchored in or on the ground.

21. The assembly method of claim 20, further comprising the steps of:
connecting at least one selected from the group comprising support rails and support frames to the at least one pivoting unit; and
connecting at least one solar module to at least one selected from the group comprising the support rails and support frame.

22. The assembly method of claim 20, further comprising at least one selected from the group comprising:
connecting the at least one pivoting unit to a drive; and
connecting the at least one pivoting unit to another pivoting unit via at least one drive shaft.

23. A pivoting unit for a tracking apparatus for solar modules, comprising:
at least one cross member pivotable about a pivot axis;
at least one drive arch connected to the at least one cross member, which comprises a plurality of drive recesses and a plurality of retaining recesses; and
at least one rotatably mounted drive device, the at least one drive device being designed such that the at least one drive device engages in at least one of the drive recesses of the drive arch for pivoting the at least one cross member, and wherein the at least one drive device is designed such that the at least one drive device engages in at least one of the retaining recesses in order to hold the cross member in a pivot position, wherein the at least one drive device is designed such that the at least one drive device alternately engages in at least one of the drive recesses and in at least one of the retaining recesses, wherein the drive device comprises at least one eccentrically arranged drive element which engages in at least one of the drive recesses of the drive arch for pivoting the at least one cross member, wherein the at least one drive device comprises at least one retaining element which engages in at least one of the retaining recesses of the drive arch in order to hold the at least one cross member, and wherein the at least one drive device comprises at least one connecting element which connects at least one coupling element to the at least one drive element and the at least one retaining element, and wherein the at least one drive device comprises two connecting elements which are designed for axially guiding the drive arch.

24. The pivoting unit according to claim 23, wherein at least one one of the two connecting elements connect the at least one coupling element to the at least one drive element and the at least one retaining element.

25. The pivoting unit according to claim 23, wherein the pivoting unit comprises at least one support element for connecting the pivoting unit to at least one post which is anchored or can be anchored in or on the ground, the at least one cross member being pivotally connected about the pivot axis to the at least one support element.

26. The pivoting unit according to claim 23, wherein at least one selected from the group comprising the at least one drive element and the at least one retaining element extend between the two connecting elements.

27. The pivoting unit according to claim 23, wherein the at least one drive device extends at least in sections through the at least one support element.

28. The pivoting unit according to claim 23, wherein the at least one drive shaft or a corresponding adapter is designed to compensate for at least one selected from the group comprising angular misalignments and tolerances in the direction of the pivot axis.

29. A tracking apparatus for solar modules comprising at least one pivoting unit according to claim 23, which is arranged on at least one post which is anchored or can be anchored in or on the ground.

30. An assembly method for a tracking apparatus comprising the steps of:
assembling a pivoting unit according to claim 23; and
connecting the assembled pivoting unit to posts which are anchored or can be anchored in or on the ground.

31. The assembly method of claim 30, further comprising the steps of:
connecting at least one selected from the group comprising support rails and support frames to the at least one pivoting unit; and
connecting at least one solar module to at least one selected from the group comprising the support rails and support frame.

32. The assembly method of claim 30, further comprising at least one selected from the group comprising:
connecting the at least one pivoting unit to a drive; and
connecting the at least one pivoting unit to another pivoting unit via at least one drive shaft.

* * * * *